US011405521B2

(12) United States Patent
Choi et al.

(10) Patent No.: US 11,405,521 B2
(45) Date of Patent: Aug. 2, 2022

(54) ELECTRONIC DEVICE FOR PROCESSING FILE INCLUDING MULTIPLE RELATED PIECES OF DATA

(71) Applicant: Samsung Electronics Co., Ltd., Suwon-si (KR)

(72) Inventors: Jongbum Choi, Suwon-si (KR); Kihuk Lee, Suwon-si (KR); Jungeun Lee, Suwon-si (KR); Hyungju Chun, Suwon-si (KR); Sungoh Kim, Suwon-si (KR); Youngjo Kim, Suwon-si (KR); Hyunhee Park, Suwon-si (KR); Arang Lee, Suwon-si (KR); Sungjun Lim, Suwon-si (KR); Changsu Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/749,332

(22) Filed: Jan. 22, 2020

(65) Prior Publication Data

US 2020/0244835 A1     Jul. 30, 2020

(30) Foreign Application Priority Data

Jan. 30, 2019  (KR) .......................... 10-2019-0012119

(51) Int. Cl.
*H04N 1/32* (2006.01)
*G06F 16/583* (2019.01)
(Continued)

(52) U.S. Cl.
CPC ......... *H04N 1/32128* (2013.01); *G06F 16/51* (2019.01); *G06F 16/583* (2019.01);
(Continued)

(58) Field of Classification Search
CPC ........... H04N 1/32128; H04N 2101/00; H04N 2201/0084; G06F 16/583; G06F 16/51; G06F 16/164; H04L 67/06; H04L 69/04
See application file for complete search history.

(56) References Cited

U.S. PATENT DOCUMENTS

2004/0243648 A1\* 12/2004 Hidaka .............. H04N 1/32358
2004/0264775 A1\* 12/2004 Slobodin ............ H04N 1/00127
382/174
(Continued)

FOREIGN PATENT DOCUMENTS

| EP | 1 763 215 A2 | 3/2007 |
|---|---|---|
| KR | 10-2017-0029244 A | 3/2017 |
| KR | 10-2017-0037088 A | 4/2017 |

OTHER PUBLICATIONS

International Search Report with Written Opinion dated May 4, 2020; International Appln. No. PCT/KR2020/001290.
(Continued)

*Primary Examiner* — Jason A Flohre
(74) *Attorney, Agent, or Firm* — Jefferson IP Law, LLP

(57) ABSTRACT

An electronic device is provided. The electronic device includes a housing, a wireless communication circuit, a camera configured to generate raw image data, at least one processor, and a memory. The memory stores instructions configured, when executed, to enable the processor to process first image data corresponding to raw image data via a first algorithm and generate second image data, process the first image data or the second image data via a second algorithm and generate third image data, the second algorithm being different from the first algorithm, generate a first file including the second image data and the third image data, receive priority information from an external electronic device via the wireless communication circuit, generate a second file including the second image data and the third
(Continued)

image data based on the priority information, and transmit the second file via the wireless communication circuit to the external electronic device.

20 Claims, 26 Drawing Sheets

(51) Int. Cl.
H04L 67/06 (2022.01)
G06F 16/51 (2019.01)
H04N 101/00 (2006.01)
(52) U.S. Cl.
CPC .......... H04L 67/06 (2013.01); *H04N 2101/00* (2013.01); *H04N 2201/0084* (2013.01)

(56) References Cited

U.S. PATENT DOCUMENTS

| | | | | |
|---|---|---|---|---|
| 2005/0128316 | A1* | 6/2005 | Sugimori | H04N 1/6077 348/223.1 |
| 2005/0146621 | A1* | 7/2005 | Tanaka | H04N 1/00137 348/211.2 |
| 2006/0150224 | A1 | 7/2006 | Kamariotis | |
| 2007/0052819 | A1* | 3/2007 | Nakao | H04N 1/00204 348/231.1 |
| 2007/0076102 | A1* | 4/2007 | Date | H04N 21/43632 348/231.99 |
| 2008/0079823 | A1* | 4/2008 | Kojima | H04N 5/772 348/231.99 |
| 2010/0066861 | A1* | 3/2010 | Sakagami | H04N 5/772 348/231.6 |
| 2010/0195929 | A1* | 8/2010 | Inoue | H04N 1/00137 382/274 |
| 2011/0299410 | A1* | 12/2011 | Diab | G06Q 30/0226 370/252 |
| 2014/0223482 | A1* | 8/2014 | McIntosh | G11B 27/034 725/41 |
| 2014/0241647 | A1 | 8/2014 | Wee et al. | |
| 2015/0070581 | A1 | 3/2015 | Suzuki et al. | |
| 2015/0093023 | A1 | 4/2015 | Greenebaum et al. | |
| 2016/0006667 | A1 | 1/2016 | Lin et al. | |
| 2016/0041936 | A1 | 2/2016 | Lee et al. | |
| 2016/0269571 | A1* | 9/2016 | Kusaka | H04N 5/23206 |
| 2017/0068821 | A1 | 3/2017 | Jung et al. | |
| 2017/0094372 | A1 | 3/2017 | Moon et al. | |
| 2018/0336666 | A1 | 11/2018 | Kim et al. | |
| 2019/0007596 | A1* | 1/2019 | Watanabe | H04N 5/23229 |

OTHER PUBLICATIONS

European Search Report dated Aug. 24, 2021, issued in European Application No. 20748437.9.

* cited by examiner

ELECTRONIC DEVICE FOR PROCESSING FILE INCLUDING MULTIPLE RELATED PIECES OF DATA

CROSS-REFERENCE TO RELATED APPLICATION(S)

This application is based on and claims priority under 35 U.S.C. § 119(a) of a Korean patent application number 10-2019-0012119, filed on Jan. 30, 2019, in the Korean Intellectual Property Office, the disclosure of which is incorporated by reference herein in its entirety.

BACKGROUND

1. Field

The disclosure relates to an electronic device for managing and sharing a single file including a plurality of pieces of data related to each other.

2. Description of Related Art

A plurality of pieces of data related to each other may be generated by various methods and devices and may be stored in separate files. An image viewer may manage and display the plurality of pieces of data in the same file.

When an electronic device transmits a file containing image data to another electronic device, the image data may be in a data format which may not be displayed on the other electronic device. As another example, when an electronic device transmits a file including a plurality of related pieces of data (image data or information data) to another electronic device, data which the other electronic device does not need may also be transmitted, resulting in an increase in the amount of data transmitted. When an image viewer displays a file including a plurality of pieces of data, only image data which represents the file among the pieces of data may be decoded and displayed, and the image data representing the file may be difficult to change.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device which may selectively transmit only some of a plurality of pieces of data included in a file to another electronic device and change the position of some of the plurality of pieces of data included in the file.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a wireless communication circuit, a camera exposed through the housing, at least one processor operatively connected with the wireless communication circuit and the camera, and a memory operatively connected with the processor, wherein the memory stores instructions configured, when executed, to enable the processor to process first image data corresponding to raw image data, the raw image data generated by the camera and stored in the memory, via a first algorithm to generate second image data, process the first image data or the second image data via a second algorithm different from the first algorithm to generate third image data, generate a first file including the second image data and the third image data in a payload, receive priority information from an external electronic device via the wireless communication circuit, generate a second file including the second image data and the third image data in a payload based on the priority information, and transmit the second file via the wireless communication circuit to the external electronic device.

In accordance with another aspect of the disclosure, a method of processing a file by an electronic device is provided. The method includes processing first image data corresponding to raw image data via a first algorithm to generate second image data, processing the first image data or the second image data via a second algorithm different from the first algorithm to generate third image data, generating a first file including the second image data and the third image data in a payload, receiving priority information from an external electronic device, generating a second file including the second image data and the third image data in a payload based on the priority information, and transmitting the second file to the external electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
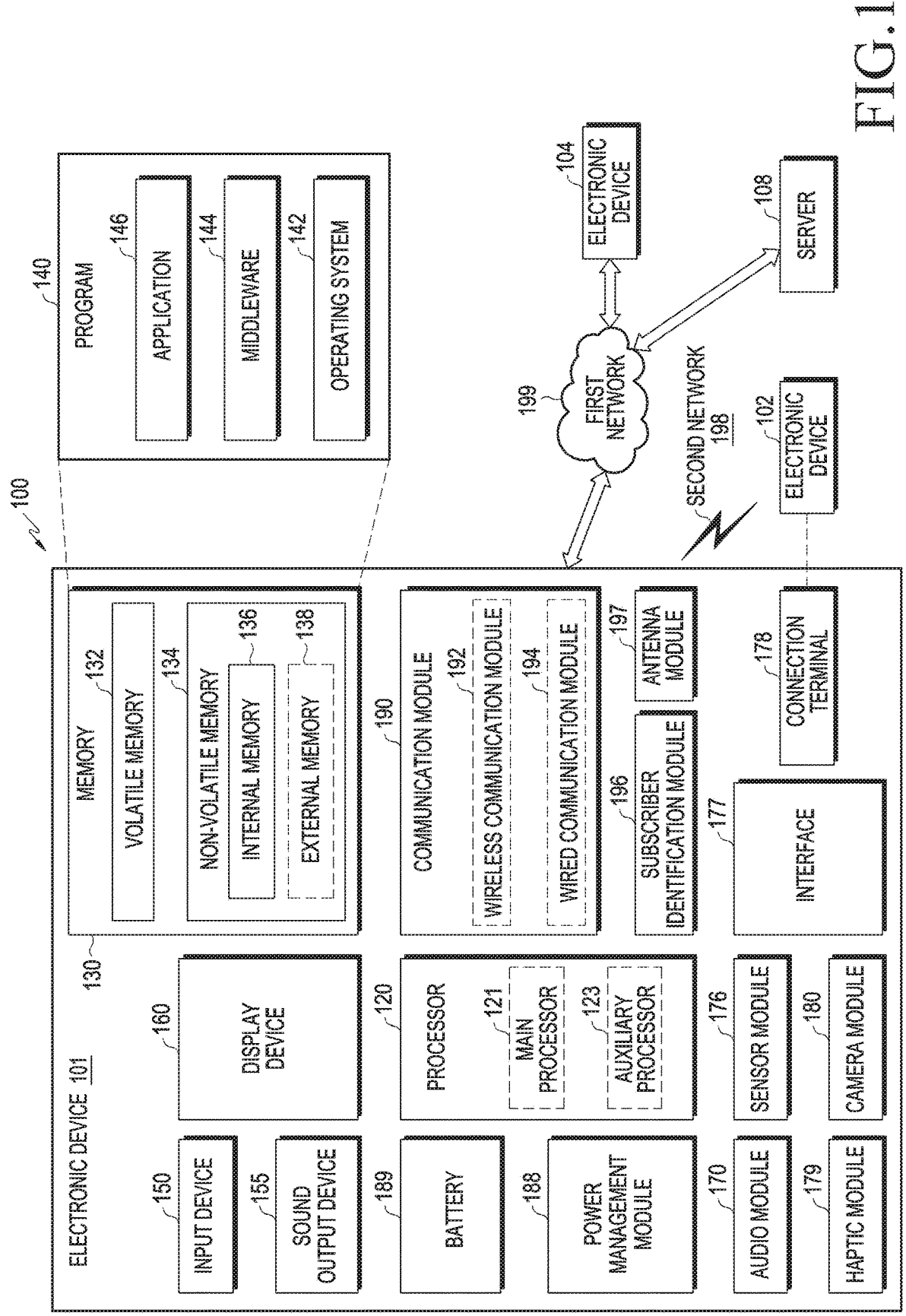
FIG. 1 illustrates a network environment including an electronic device according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing recordings, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
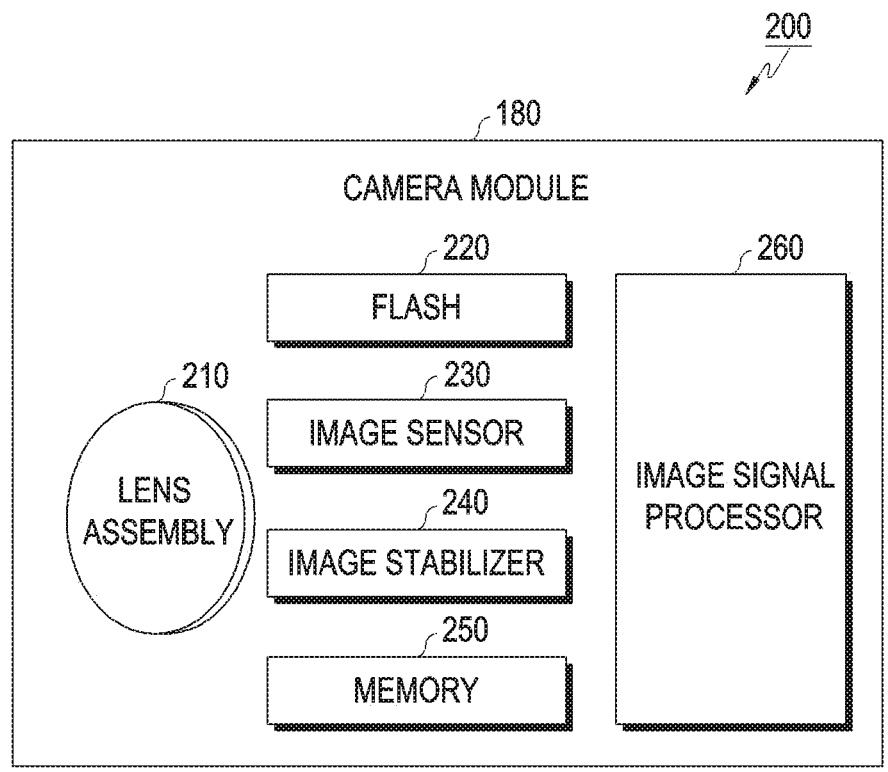
FIG. 2A is a block diagram illustrating a camera module according to an embodiment of the disclosure.

FIG. 2A is a block diagram 200 illustrating a camera module 180 according to an embodiment of the disclosure.

Referring to FIG. 2A, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In this case, the camera module 180 may be, e.g., a dual camera, a 360-degree camera, or a spherical camera. The plurality of lens assemblies 210 may have the same lens attribute (e.g., view angle, focal length, autofocusing, f number, or optical zoom), or at least one lens assembly may have at least one different lens attribute from another lens assembly. The lens assembly 210 may include, for example, a wide-angle lens or a telephoto lens. The flash 220 may emit light that is used to reinforce light from an object. The flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light transmitted from the object via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented as, e.g., a charged coupled device (CCD) sensor or a complementary metal oxide semiconductor (CMOS) sensor.

The image stabilizer 240 may move in a particular direction, or control (e.g., adjust the read-out timing of), the image sensor 230 or at least one lens included in the lens assembly 210 to at least partially compensate for a negative effect (e.g., image blurring) on a captured image, which is caused by the motion of the camera module 180 or the electronic device 101 including the camera module 180, in response to the motion. According to an embodiment, the image stabilizer 240 may be implemented as, e.g., an optical image stabilizer. The image stabilizer 240 may sense such movement using a gyro sensor (not shown) or an acceleration sensor (not shown) disposed inside or outside the camera module 180.

The memory 250 may store, at least temporarily, at least part of an image obtained via the image sensor 230 for a subsequent image processing task. For example, when image capturing is delayed due to shutter lag or multiple images are quickly captured, a raw image obtained (e.g., a high-resolution image) may be stored in the memory 250, and its corresponding copy (e.g., a low-resolution image) may be previewed through the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform image processing (e.g., depth map generation, three-dimensional (3D) modeling, panorama generation, feature point extraction, image mixing, or image compensation (e.g., noise canceling, resolution adjustment, brightness adjustment, blurring, sharpening, or softening)) on an image obtained through the image sensor 230 or an image stored in the memory 250. Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be transferred to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. When the image signal processor 260 is configured as a separate processor, images processed by the image signal processor 260 may be displayed through the display device 160 as they are or after further processed by the processor 120.

According to an embodiment, the electronic device 101 may include two or more camera modules 180 with different attributes or functions. In this case, at least one of the camera modules 180 may be, e.g., a wide-angle camera or a front camera while at least one other camera module may be a telephoto camera or a rear camera.

Figure 2B:
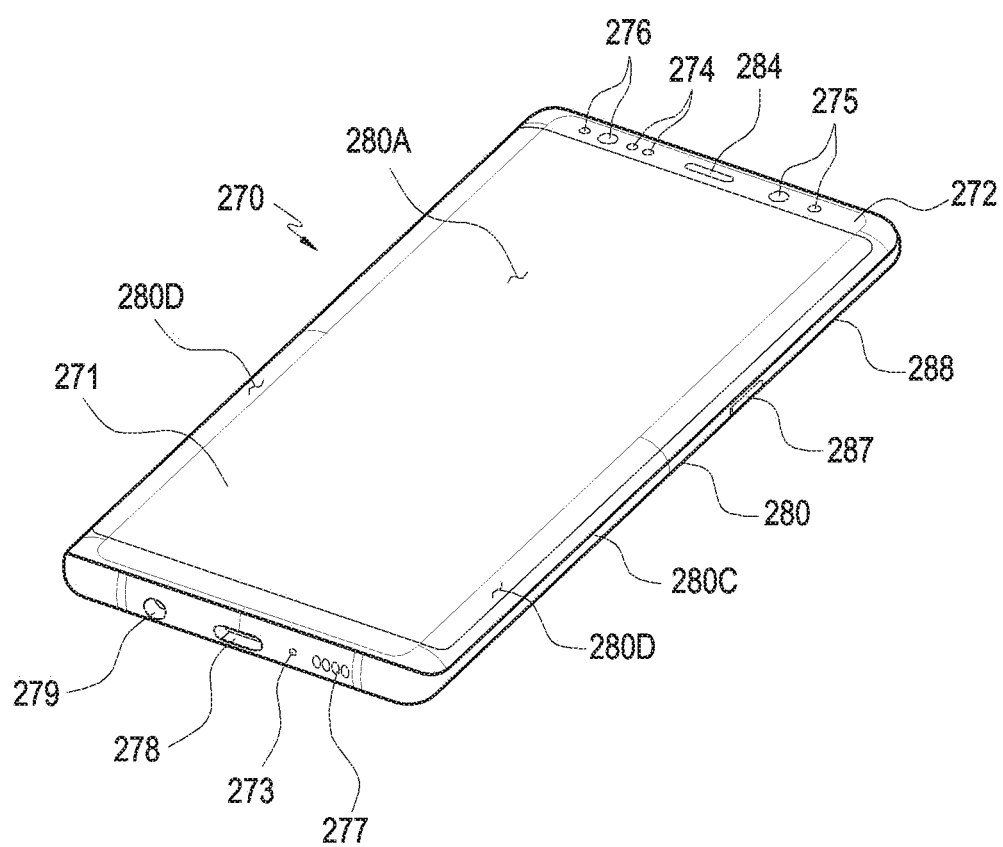
FIG. 2B is a front perspective view illustrating an electronic device according to an embodiment of the disclosure.

FIG. 2B is a front perspective view illustrating an electronic device according to an embodiment of the disclosure.

Figure 2C:
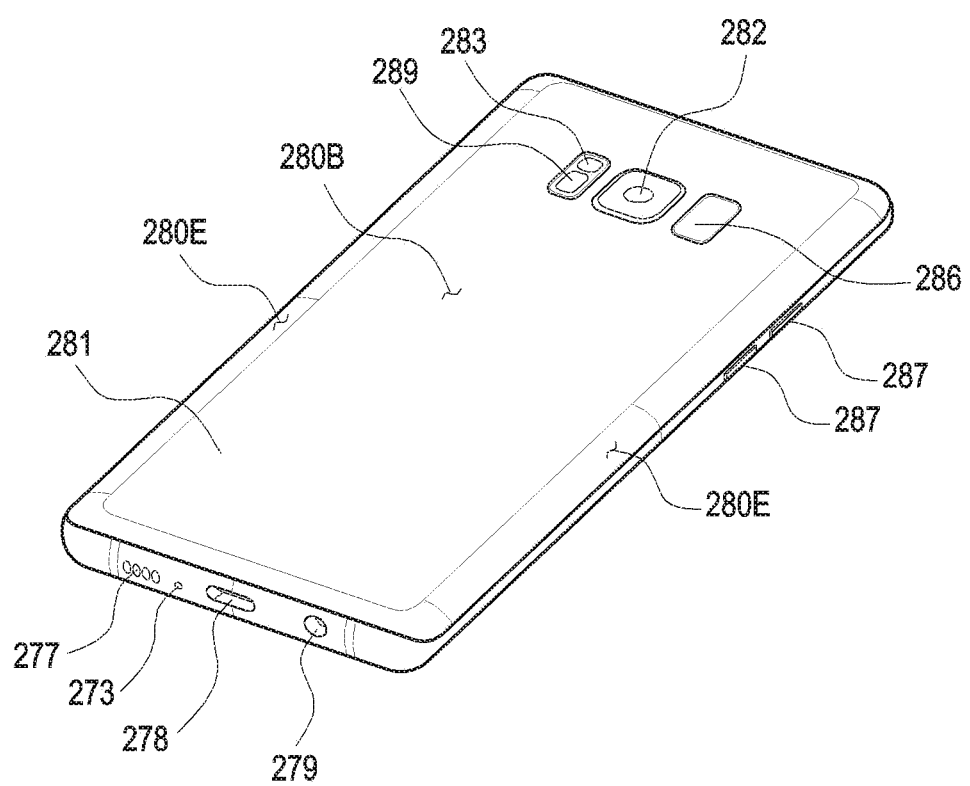
FIG. 2C is a rear perspective view illustrating the electronic device of FIG. 2B.

FIG. 2C is a rear perspective view illustrating the electronic device of FIG. 2B according to an embodiment of the disclosure.

Referring to FIGS. 2B and 2C, according to an embodiment, an electronic device 270 may include a housing 280 with a first (or front) surface 280A, a second (or rear) surface 280B, and a side surface 280C surrounding a space between the first surface 280A and the second surface 280B. According to another embodiment (not shown), the housing may denote a structure forming part of the first surface 280A, the second surface 280B, and the side surface 280C of FIG. 1. According to an embodiment, at least part of the first surface 280A may have a substantially transparent front plate 272 (e.g., a glass plate or polymer plate including various coat layers). The second surface 280B may be formed of a substantially opaque rear plate 281. The rear plate 281 may be formed of, e.g., laminated or colored glass, ceramic, polymer, metal (e.g., aluminum, stainless steel (STS), or magnesium), or a combination of at least two thereof. The side surface 280C may be formed by a side bezel structure (or a "side member") 288 that couples to the front plate 272 and the rear plate 281 and includes a metal and/or polymer. According to an embodiment, the rear plate 281 and the side bezel structure 288 may be integrally formed together and include the same material (e.g., a metal, such as aluminum).

In the embodiment illustrated, the front plate 272 may include two first regions 280D, which seamlessly and flexibly extend from the first surface 280A to the rear plate 281, on both the long edges of the front plate 272. In the embodiment (refer to FIG. 2) illustrated, the rear plate 281 may include second regions 280E, which seamlessly and flexibly extend from the second surface 280B to the front plate 272, on both the long edges. According to an embodiment, the front plate 272 (or the rear plate 281) may include only one of the first regions 280D (or the second regions 280E). Alternatively, the first regions 280D or the second regions 280E may partially be excluded. According to an embodiment, at side view of the electronic device 270, the side bezel structure 288 may have a first thickness (or width) for sides that do not have the first regions 280D or the second regions 280E and a second thickness, which is smaller than the first thickness, for sides that have the first regions 280D or the second regions 280E.

According to an embodiment, the electronic device 270 may include at least one of a display 271, audio modules 273, 277, and 284, sensor modules 274, 286, and 289, camera modules 275 and 282, flash 283, key input device 287, a light emitting device 276, a pen input device, and connector holes 278 and 279. According to an embodiment, the electronic device 270 may exclude at least one (e.g., the key input device 287 or the light emitting device 276) of the components or may add other components.

The display 271 may be exposed through a considerable portion of, e.g., the front plate 272. According to an embodiment, at least a portion of the display 271 may be exposed through the front plate 272 forming the first surface 280A and the first regions 280D of the side surface 280C. According to an embodiment, the edge of the display 271 may be formed to be substantially the same in shape as an adjacent outer edge of the front plate 272. According to an embodiment (not shown), the interval between the outer edge of the display 271 and the outer edge of the front plate 272 may remain substantially even to give a larger area of exposure to the display 271.

According to an embodiment (not shown), the screen display region of the display 271 may have a recess or opening in a portion thereof, and at least one or more of the audio module 284, sensor module 274, camera module 275, and light emitting device 276 may be aligned with the recess or opening. According to an embodiment (not shown), at least one or more of the audio module 284, sensor module 274, camera module 275, sensor module 286, and light emitting device 276 may be included on the rear surface of the screen display region of the display 271. According to an embodiment (not shown), the display 271 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor modules 274 and 289 and/or at least part of the key input device 287 may be disposed in the first regions 280D and/or the second regions 280E.

The audio modules 273, 277, and 284 may include a microphone hole 273 and speaker holes 277 and 284. The microphone hole 273 may have a microphone inside to obtain external sounds. According to an embodiment, there may be a plurality of microphones to be able to detect the direction of a sound. The speaker holes 277 and 284 may include an external speaker hole 277 and a phone receiver hole 284. According to an embodiment, the speaker holes 277 and 284 and the microphone hole 273 may be implemented as a single hole, or speakers may be rested without the speaker holes 277 and 284 (e.g., piezo speakers).

The sensor modules 274, 286, and 289 may generate an electrical signal or data value corresponding to an internal operating state or external environmental state of the electronic device 270. The sensor modules 274, 286, and 289 may include a first sensor module 274 (e.g., a proximity sensor) and/or a second sensor module (not shown) (e.g., a fingerprint sensor) disposed on the first surface 280A of the housing 280 and/or a third sensor module 289 (e.g., a heart-rate monitor (HRM) sensor) and/or a fourth sensor module 286 (e.g., a fingerprint sensor) disposed on the second surface 280B of the housing 280. The fingerprint sensor may be disposed on the second surface 280A as well as on the first surface 280A (e.g., the display 271) of the housing 280. The electronic device 270 may further include sensor modules 274 including, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 274.

The first camera module 275 may be disposed on the first surface 280A of the electronic device 270, and a second camera module 282 and/or a flash 283 may be disposed on the second surface 280B. The camera modules 275 and 282 may include one or more lenses, an image sensor, and/or an image signal processor. The flash 283 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 270.

The key input device 287 may be disposed on the side surface 280C of the housing 280. According to an embodiment, the electronic device 270 may exclude all or some of the above-mentioned key input devices 287 and the excluded key input devices 287 may be implemented in other forms, e.g., as soft keys, on the display 271. According to an embodiment, the key input device may include the sensor module 286 disposed on the second surface 280B of the housing 280.

The light emitting device 276 may be disposed on, e.g., the first surface 280A of the housing 280. The light emitting device 276 may provide, e.g., information about the state of the electronic device 270 in the form of light. According to an embodiment, the light emitting device 276 may provide a light source that interacts with, e.g., the camera module 275. The light emitting device 276 may include, e.g., a light emitting device (LED), an infrared (IR) LED, or a xenon lamp.

The connector holes 278 and 279 may include a first connector hole 278 for receiving a connector (e.g., a universal serial bus (USB) connector) for transmitting or receiving power and/or data to/from an external electronic device and/or a second connector hole 279 (e.g., an earphone jack) for receiving a connector for transmitting or receiving audio signals to/from the external electronic device.

Figure 3:
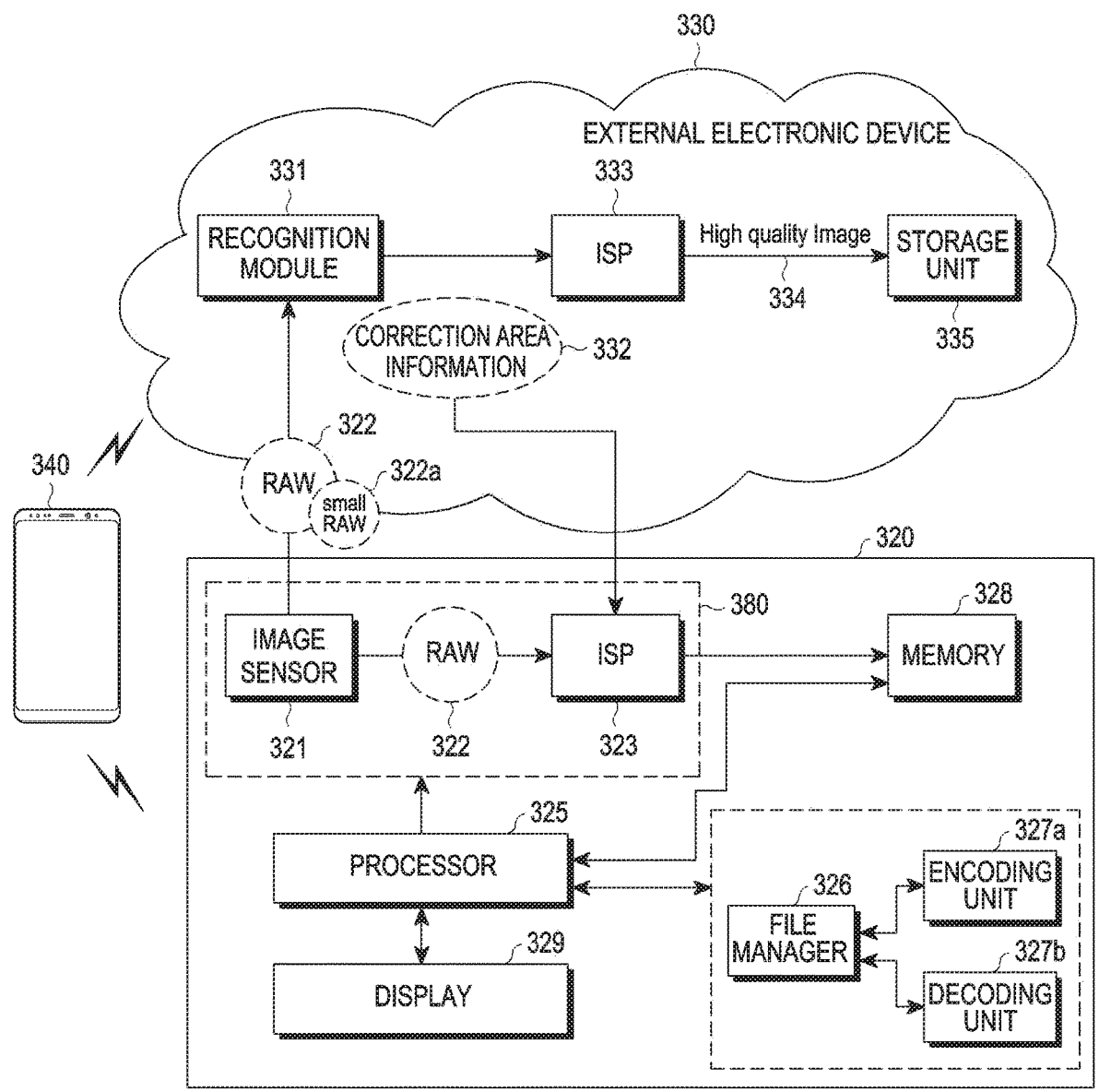
FIG. 3 is a view illustrating an example configuration in which an electronic device and an external electronic device are operated according to an embodiment of the disclosure.

FIG. 3 is a view illustrating an example configuration in which an electronic device and an external electronic device are operated according to an embodiment of the disclosure.

Referring to FIG. 3, an electronic device 320 (e.g., the electronic device 101 of FIG. 1) may include a camera module 380, a processor 325, a file manager 326, an encoding unit 327a, a decoding unit 327b, a memory 328, and/or a display 329. Although not shown, the electronic device 320 may include a communication module (e.g., the communication module 190 of FIG. 1) capable of transmitting and receiving data to/from an external electronic device 330 (e.g., the server 108 of FIG. 1).

The camera module 380 (e.g., the camera module 180 of FIG. 1 or the camera module 180 of FIG. 2) may include an image sensor 321 and an ISP 323.

The image sensor 321 may obtain image data for an external object and generate raw image data 322 corresponding thereto. The image sensor 321 may obtain various forms of raw image data according to color filter array (CFA) patterns. Use of the dual pixel (DP) structure (or 2PD) of the image sensor 321 enables obtaining raw image data containing information for different pieces of phase (or view) difference information in one pixel. One or more pieces of raw image data may be obtained for one scene using a plurality of image sensors with same or different properties (e.g., dual sensors (e.g., RGB+RGB, RGB+Mono, or Wide+Tele) or an array sensor (e.g., one with two or more sensors)). The obtained raw image data may undergo no or additional processing and be stored in the memory 328 or an internal memory of the camera module.

The raw image data 322 may be formed in various formats (e.g., a layer format). The raw image data 322 may be represented in one color of red (R), green (G), and blue (B) for the pixel and may be expressed at a bit depth of eight to 16 bits. Various CFA patterns may apply to the raw image data 322. The raw image data 322 may be raw image data of a layer structure containing information for several colors (e.g., two or more of R, G, and B) for one pixel. The raw image data 322 may contain phase difference information as well as color information (e.g., RGB) depending on various configurations of the image sensor 321. Information (e.g., time, position, or illuminance) related to image capturing may be generated as metadata and be stored in relation to the raw image data.

The image sensor 321 may transfer the raw image data 322 to the ISP 323.

The image sensor 321 may generate small raw image data 322a and transmit the small raw image data 322a via the communication module to the external electronic device 330. According to an embodiment, the small raw image data 322a may be generated by downscaling (e.g., an operation for decreasing the size or resolution) the raw image data 322 or downsampling (e.g., an operation for taking only one or some of a series of samples) the raw image data 322.

According to an embodiment, the processor 325 of the electronic device 320, instead of the image sensor 321, may generate the small raw image data 322a and may transmit the generated small raw image data 322a via the communication module to the external electronic device 330. According to an embodiment, the image sensor 321 may include a small raw image generating unit capable of generating the small raw image data 322a, or a small raw image generating unit may be provided separately from the electronic device 320.

The image sensor may transmit the raw image data 322 which has been compressed via various compression algorithms to the ISP 323 or the external electronic device 330. The image sensor may compress the raw image data 322 for partial processing and store the compressed raw image data 322 in the internal memory of the image sensor 321. The image sensor 321 may transmit the small raw image data 322a, which has been compressed via various compression algorithms, to the external electronic device 330.

The ISP 323 may correct first image data corresponding to the raw image data 322 using correction area information 332, thereby generating a corrected image. The corrected image may have, e.g., a YUB format. The corrected image may be stored in the memory 328. Or, the corrected image may be compressed as per, e.g., a Joint Photographic Experts Group (JPEG) scheme, and the compressed image data may be stored in the memory 328.

According to an embodiment, the file manager 326 may process first image data corresponding to the raw image data 322 via a first algorithm to generate second image data, process the first image data or the second image data via a second algorithm different from the first algorithm to generate third image data, and generate a first package file including at least two pieces of data of the first image data, the second image data, or the third image data in the payload.

According to an embodiment, the first algorithm may differ from the second algorithm in at least one of filter, compression scheme, resolution, or image format.

According to an embodiment, the file manager 326 may generate management data including an identification code for identifying whether there is a transformation for processing at least one of the plurality of pieces of data included in the payload of the first package file, a read and/or write authority, a distribute authority, whether encoded or not, kind of encoding, or copyright-related data and include the management data, as additional data management information, in the first package file.

According to an embodiment, the file manager 326 may transmit some image data among the plurality of pieces of data included in the first package file to a first electronic device 340 (e.g., the electronic device 102 or 104 of FIG. 1).

According to an embodiment, the file manager 326 may generate management data including an identification code for identifying whether there is a transformation for processing at least one of the plurality of pieces of data included in the payload of the first package file, a read and/or write authority, a distribute authority, whether encoded or not, kind of encoding, or copyright-related data and include the management data, as additional data management information, in the first package file.

According to an embodiment, the file manager 326 may generate a second package file including at least one image data among the plurality of pieces of data included in the payload of the first package file based on the priority information received from the first electronic device 340 and transmit the second package file to the first electronic device 340. For example, the priority information received from the first electronic device 340 may include information for at least one of a filter, compression scheme, resolution, or image format for the first electronic device 340 to process the image data. For example, if the compression scheme of the first electronic device 340 is a high efficiency image file (HEIF) scheme based on the priority information from the first electronic device 340, the file manager 326 may generate the second package file, which includes, in its payload, image data compressed in the HEIF scheme among the plurality of pieces of data included in the payload of the first package file and transmit the second package file to the first electronic device 340.

According to an embodiment, the file manager 326 may generate the second package file, which includes, in its payload, at least one piece of image data selected by the user from among the plurality of pieces of data included in the first package file, and transmit the second package file to the first electronic device 340.

According to an embodiment, the file manager 326 may generate management data including an identification code for identifying whether there is a transformation for processing at least one of the plurality of pieces of data included in the payload of the second package file, a read and/or write authority, a distribute authority, whether encoded or not, kind of encoding, or copyright-related data and include the management data, as additional data management information, in the second package file.

According to an embodiment, the file manager 326 may request an external electronic device 330 (e.g., the server 108 of FIG. 1) to transmit at least one piece of image data (e.g., the first image data corresponding to the raw image data) among the plurality of pieces of data included in the first package file to the first electronic device 340. The external electronic device 330 may generate third image data, which is the result of correcting the at least one piece of data (e.g., the first image data corresponding to the raw image data) received from the electronic device 320, store image data obtained by compressing the third image data to correspond to compatible information for the first electronic device 340, as representative data, generate a package file, which stores, in the payload, correction information for the image data corresponding to the representative data, as additional data, and transmit the package file to the first electronic device 340. For example, if the electronic device 320 processes image compression according to a JPEG scheme, and the first electronic device 340 processes image compression according to the HEIF scheme, the external electronic device 330 may generate third image data, which is the result of correcting the image data (e.g., the first image data corresponding to the raw image data) received from the electronic device 320 and transmit a package file, which includes image data, obtained by compressing the third image data according to the HEIF scheme, as representative data, and transmit the package file to the first electronic device 340.

According to an embodiment, the file manager 326 may request the external electronic device 330 to transmit at least one piece of data (e.g., the first image data corresponding to the raw image data) selected by the user from among the plurality of pieces of data included in the first package file and additional data management information for checking whether the at least one piece of image data has transformed to the first electronic device 340 (e.g., the electronic device 102 or 104 of FIG. 1). The external electronic device 330 may add the information (e.g., MD5 or CRC) for checking whether the at least one piece of image data has transformed to the additional data management information and generate the third image data which is obtained by correcting the image data (e.g., the first image data corresponding to the raw image data) received from the electronic device 320. The external electronic device 330 may store the third image data generated by the external electronic device 330 as representative data, store correction data for the representative data as additional data, and transmit, to the first electronic device 340, a package file which includes, in the payload, the additional data management information containing the information for checking whether there is a transformation.

According to an embodiment, the file manager 326 may request the external electronic device 330 to transmit at least one piece of data (e.g., the first image data corresponding to the raw image data) selected by the user from among the plurality of pieces of data included in the first package file and additional data management information containing authority setting information for the at least one piece of additional data to the first electronic device 340 (e.g., the electronic device 102 or 104 of FIG. 1). The external electronic device 330 may generate the third image data which is obtained by correcting the at least one piece of data (e.g., the first image data corresponding to the raw image data) received from the electronic device 320. The external electronic device 330 may store the third image data generated by the external electronic device 330 as representative data, store correction data for the representative data as additional data, and transmit, to the first electronic device 340, a package file which includes the additional data management information containing the authority setting information.

According to an embodiment, the file manager 326 may change the representative data according to the user's selection or the representative data change condition set in the first package file containing a plurality of pieces of data related to each other. For example, the file manager 326 may generate the first package file containing a plurality of pieces of data having the same name. According to an embodiment, the file manager 326 may store first image data corresponding to the raw image data 322 obtained via the image sensor 321, as additional data, and may generate the first package file which stores, as representative data, the second image data generated by the ISP 323 correcting the raw image data 322. The file manager 326 may store the correction information for the second image data, as additional data to the first package file, in the first package file. The file manager 326 may store the additional data management information, which stores information about the additional data or the representative data included in the first package file, in the first package file.

According to an embodiment, upon receiving the third image data, which is the result of correcting the first image data corresponding to the raw image data 322 from the external electronic device 330, the file manager 326 may store the third image data, as representative data, in the first package file, change the additional data to the second image data, which is the result of correction by the ISP 323, and store it in the first package file. The file manager 326 may store the correction information for the third image data, as additional data to the first package file, in the first package file.

According to an embodiment, upon receiving the third image data, which is the result of correcting the first image data corresponding to the raw image data 322, from the external electronic device 330, the file manager 326 may store the third image data, as the additional data to the first package file, in the first package file. The file manager 326 may display the representative data of the first package file, as default image data, in an image viewer and, if the third image data, as representative data, is selected by the user while the second image data corresponding to the representative data included in the first package file, and the first image data and third image data corresponding to at least one piece of additional data are all displayed by the user's selection, change the representative data to the third image data, which is the result of correction by the external electronic device 330, and change the additional data to the second image data, which is the result of correction by the ISP 323.

According to an embodiment, upon obtaining fourth image data by editing (e.g., modify, add, or delete) the image data (e.g., the second image data or the third image data) corresponding to the representative data of the first package file, the file manager 326 may store the fourth image data, as representative data, in the first package file, and change the additional data to the pre-editing image data (e.g., the second image data or third image data). The file manager 326 may store edit information for the fourth image data stored as representative data, as additional data to the first package file, in the first package file.

According to an embodiment, upon obtaining fourth image data by editing (e.g., modify, add, or delete) the image data (e.g., the second image data or the third image data) corresponding to the representative data of the first package file, the file manager 326 may store the fourth image data, as additional data, in the first package file. If the fourth image data is selected as representative data by the user's selection, the file manager 326 may change the representative data to the fourth image data and change the additional data to the pre-editing image data (e.g., the second image data or third image data).

According to an embodiment, upon obtaining fifth image data which is the result of editing (e.g., modify or delete) a portion of the image data (e.g., the second image data or third image data) corresponding to the representative data of the first package file, the file manager 326 may store image data, which is the result of synthesizing the portion edited from the image data (e.g., the second image data or third image data) and the fifth image data, as representative data, and store the image data corresponding to the pre-editing portion of the image data (e.g., the second image data or third image data), as additional data, in the first package file.

According to an embodiment, upon obtaining the fifth image data resulting from editing (e.g., modify or delete) the portion of the image data (e.g., the second image data or third image data) corresponding to the representative data of the first package file, the file manager 326 may additionally store the fifth image data, as additional data, in the first package file. If application of the fifth image data to the representative data is selected by the user, the file manager 326 may store image data, which is the result of synthesizing the portion edited from the image data (e.g., the second image data or third image data) corresponding to the representative data and the fifth image data, as representative data, and store the image data corresponding to the pre-editing portion of the image data (e.g., the second image data or third image data), as additional data, in the first package file.

According to an embodiment, the file manager 326 may store at least one piece of image data included in the first package file in the external electronic device 330 and store the location address of the external electronic device 330, at which the image data has been stored, instead of the image data, in the at least one additional area where the at least one piece of image data used to be stored in the first package file, thereby reducing the size of the first package file.

According to an embodiment, the file manager 326 may receive the package file which contains, in the payload, a plurality of pieces of data or a plurality of pieces of data and additional data management information from the external electronic device 330 (e.g., the server 108 of FIG. 1 or the first electronic device 340 (e.g., the electronic device 102 or 104 of FIG. 1)).

According to an embodiment, the file manager 326 may transmit priority information for the electronic device 320 to the first electronic device 340 and receive the package file containing the plurality of pieces of data in the payload based on the priority information for the electronic device 320. For example, the priority information for the electronic device 320 may include information for at least one of a filter, compression scheme, resolution, or image format for the first electronic device 340 to process the image data.

According to an embodiment, upon receiving the package file containing a plurality of pieces of data or a plurality of pieces of data and additional data management information from the first electronic device 340, the file manager 326 may generate a package file which stores image data among the plurality of pieces of data as representative data and the rest as additional data. Upon searching for a plurality of pieces of image data among the plurality of pieces of data, the file manager 326 may display the plurality of pieces of data to allow the user to select.

According to an embodiment, the file manager 326 may receive a package file containing the representative data and at least one piece of additional data from the external electronic device 330 and store the package file.

According to an embodiment, the file manager 326 may receive a package file containing the representative data, at least one piece of additional data, and additional data management information from the external electronic device 330 and store the package file.

According to an embodiment, upon receiving a package file containing additional data management information from the first electronic device 340 or the external electronic device 330, the file manager 326 may check if the additional data has transformed based on information (e.g., MD5 or CRC) for checking whether the additional data of the package file containing the additional management information transforms. The file manager 326 may identify an authority setting for the additional data based on the authority setting information for the additional data included in the additional management information. The file manager 326 may generate new image data by editing any one piece of data of the representative data or additional data of the package file and store the new image data, as additional data, in the package file.

According to an embodiment, the file manager 326 may be included in the processor 325 or be provided separately from the processor 325.

According to an embodiment, the file manager 326 may control the encoding unit 327a to adjust the access authority for the additional data of the package file and control the decoding unit 327b to decode the additional data of the package file.

According to an embodiment, the file manager 326 may control the encoding unit 327a to differentially encode the additional data based on the access authority for the additional data and encode the additional data differently for each portion thereof.

According to an embodiment, if the representative data is changed in the representative data, the file manager 326 may additionally encode the additional data of the package file. The additional encoding may follow the encoding rule before the representative data is changed or may be newly set by the user. For example, if the prior encoding rule is maintained for the image editing-related portion of the additional data, the file manager 326 may stop the image editing-related information from changing.

According to an embodiment, the file manager 326 may identify the additional data management information in the package file, identify the presence of additional data, identify the access authority per additional data, and decode the encoded additional data to thereby obtain the additional data.

The encoding unit 327a and the decoding unit 327b may encode or decode the additional data of the package file.

The processor 325 (e.g., the processor 120 of FIG. 1) may transmit the raw image data 322 provided from the image sensor 321 to the external electronic device 330 separately from the small raw image data 322a.

The processor 325 may first transmit the small raw image data 322a, which is smaller in volume than the raw image data 322, and then the raw image data 322 to the external electronic device 330. For example, the processor 325 may transmit the small raw image data 322a to the external electronic device 330 while the ISP 323 corrects the raw image data 322. The processor 325 may transmit the small raw image data 322a, along with the raw image data 322, to the external electronic device 330. The processor 325 may upload the raw image data 322, as it has been generated by the image sensor 321, onto the external electronic device 330 or perform pre-processing, e.g., lens distortion compensation or noise cancellation, on the raw image data 322 and upload the pre-processed image. The above-mentioned pre-processing may be performed by the external electronic device 330.

The processor 325 may control the ISP 323 to generate second image data which is the result of correcting the first image data corresponding to the raw image data 322 using correction information received from the external electronic device.

According to an embodiment, the processor 325 may include the file manager 326, control the file manager 326, or perform substantially the same operation as the file manager 326.

The memory 328 (e.g., the memory 130 of FIG. 1) may store a package file containing representative data and at least one piece of additional data or may store a package file containing representative data, additional data management information, and at least one piece of additional data.

The display 329 (e.g., the display device 160 of FIG. 1) may display the image corresponding to the representative data of the package file.

The external electronic device 330 may include a recognition module 331, an ISP 333, and/or a storage unit 335. Although not shown, the external electronic device 330 may include a communication module capable of transmitting and receiving data with the electronic device 320. Although not shown, there may be included a pre-processing unit which may perform necessary processing before the received raw image data 322 is transferred to the recognition module 331 or the ISP 333 and may perform decompression, brief image quality enhancing, de-mosaic treatment, or image reformatting on the compressed raw image data 322. Although not shown, the file manager 326, encoding unit 327a, and decoding unit 327b of the electronic device 320 may be included substantially identically.

The recognition module 331 may be a logic module and may be implemented as a processor of the external electronic device 330. The recognition module 331 may perform the operation of analyzing various meaningful pieces of information (e.g., object recognition, velocity vector, face recognition, segmentation, or scene parsing) from image data (e.g., the raw image data or image file). The recognition module 331 may include various algorithms for those purposes. As a result of the analysis, the ISP 333 may generate, store, or transmit information (e.g., information including correction information (recipe information), segments, layers, vectors, or scene category) available for various types of image processing, in association with the image.

The recognition module 331 may obtain the small raw image data 322a via the communication module and perform segmentation on at least one image area from the small raw image data 322a. The recognition module 331 may recognize each of at least one image area divided by the segmentation. Correction area information 332 may be generated which includes at least one of information associated with a plurality of image areas, e.g., information about the coordinates of the image areas, generated from the recognition module 331, or a result of recognition. The correction area information 332 may be sent to the electronic device 320.

The ISP 333 may correct the raw image data 322 received from the electronic device 320. The external electronic device 330 may correct the raw image data 322 using the existing correction area information 332 generated or using expanded correction area information. The raw image data 322 may have a higher resolution than the small raw image data 322a. Thus, the ISP 333 of the external electronic device 330 may obtain expanded correction area information, which is further detailed, from the high-resolution image data.

The ISP 333 may also generate the expanded correction area information using the raw image data 322 along with the existing correction area information generated. The ISP 333 may obtain a third image corresponding to the high-quality image 334 by correcting the first image data corresponding to the raw image data 322 using the expanded correction area information. The third image data corresponding to the high-resolution image data 334 may be stored in the storage unit 335 of the external electronic device 330 and may be downloaded to the electronic device 320.

The storage unit 335 may store the small raw image data 322a, the raw image data 322, and the third image data corresponding to the high-resolution image data 334 resulting from the first image data corresponding to the raw image data 322 and the correction information 332. For example, the third image data may be stored, as image data compressed according to the JPEG scheme, in the storage unit 335.

Figure 4A:
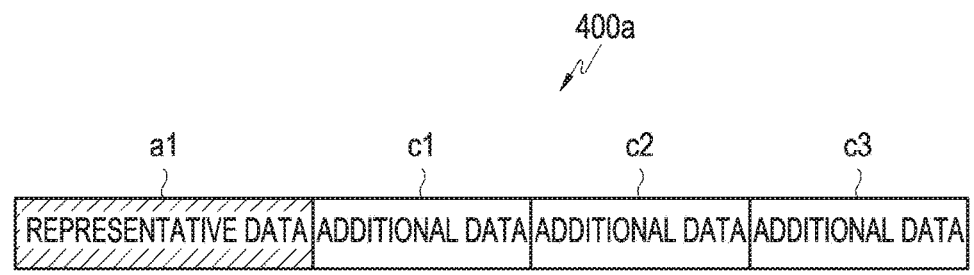
FIGS. 4A, 4B, and 4C are views illustrating a structure of a package file according to various embodiments of the disclosure.
Figure 4B:
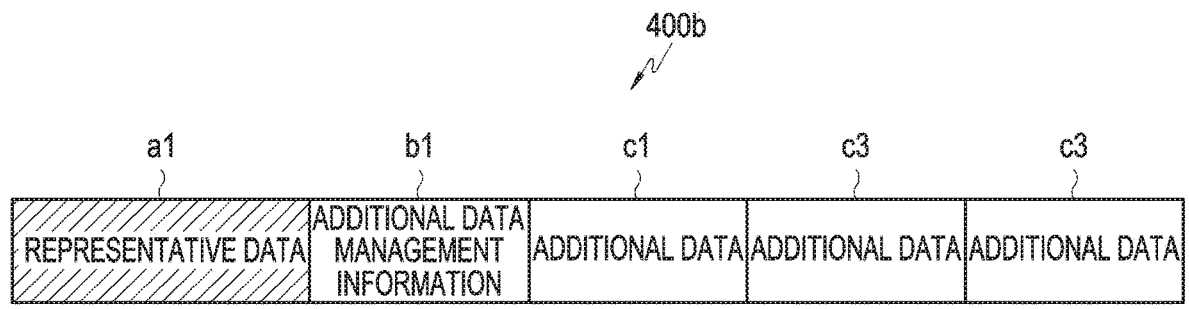
Figure 4C:
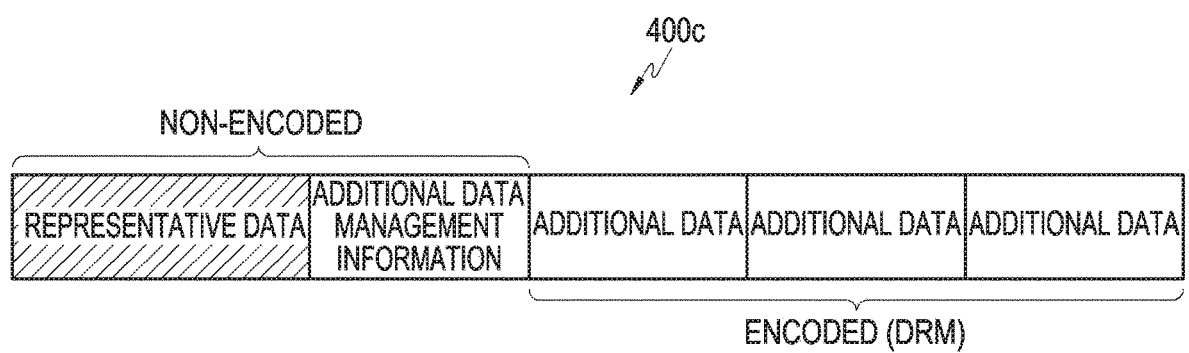

FIGS. 4A, 4B, and 4C are views illustrating a structure of a package file according to various embodiments of the disclosure.

Referring to FIG. 4A, a package file 400a may include a representative area a1 for storing one piece of representative data and a plurality of additional areas c1 to c3 for storing a plurality of pieces of additional data.

Referring to FIG. 4B, a package file 400b may include a representative area a1 for storing one piece of representative data, an additional data management area b1 for storing additional data management information, and a plurality of additional areas c1 to c3 for storing a plurality of pieces of additional data.

For example, the representative data stored in the representative area a1 may include default image data of a package file displayed in an image viewer.

According to an embodiment, the additional data stored in the additional areas c1 to c3 may include an image which has the same name as, e.g., the representative data, as data related to the representative data. The image data stored as additional data may include image data with a different format (e.g., raw, Bayer, YUV, RGB, or other bit depths) from the representative data or other additional data. The image data stored as additional data may include image data which differs in compression scheme, resolution, and quality from the representative data or other representative data.

According to an embodiment, the additional data may include information for image processing on the representative data or additional data, parameter combination information necessary for performing the image processing, correction information (e.g., recipe information) or edit information about the additional data.

According to an embodiment, the additional data management information stored in the additional data management area b1 may include such information as the size and type of the representative data and additional data and management data related to moving, distributing, or accessing the representative data and additional data according to the user or where to be used.

According to an embodiment, the additional data management information may include information related to the read/write authority for the representative data, identification code information, e.g., MD5, for identifying whether the representative data transforms, information related to the type, size, read/write authority, and distribute authority of the additional data, information related to the authority for adding or deleting the additional data, information about whether each piece of additional data has been encoded or information about the type of encoding, information related to whether the representative data and the additional data depend upon each other, and/or copyright-related data.

Referring to FIG. 4C, according to an embodiment, the additional data alone may be encoded to adjust the authority for accessing the additional data when sharing the package file 400c. A different access authority may be set per portion of the additional data, or a different degree of encoding may be set per portion of the additional data.

According to an embodiment, when the package file 400c is transmitted to the first electronic device 340 (e.g., the electronic device 102 or 104 of FIG. 1 or the first electronic device 340 of FIG. 3) and is shared, if the first electronic device lacks a file manager (e.g., the file manager 326 of FIG. 3) or the same function as the file manager, the first electronic device may not identify the additional data management information of the package file and thus cannot access the encoded additional data. If the first electronic device has a file manager (e.g., the file manager 326 of FIG. 3) or the same function as the file manager, the first electronic device may identify the additional data management information of the package file 400c and may thus identify the access authority for the additional data and decode the encoded additional data to thereby obtain the additional data.

Figure 5A:
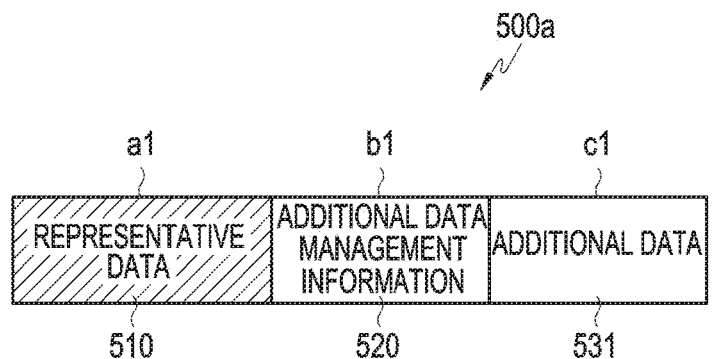
FIGS. 5A, 5B, 5C, 5D, 5E, and 5F are views illustrating the operation of changing data by an electronic device according to various embodiments of the disclosure.
Figure 5B:
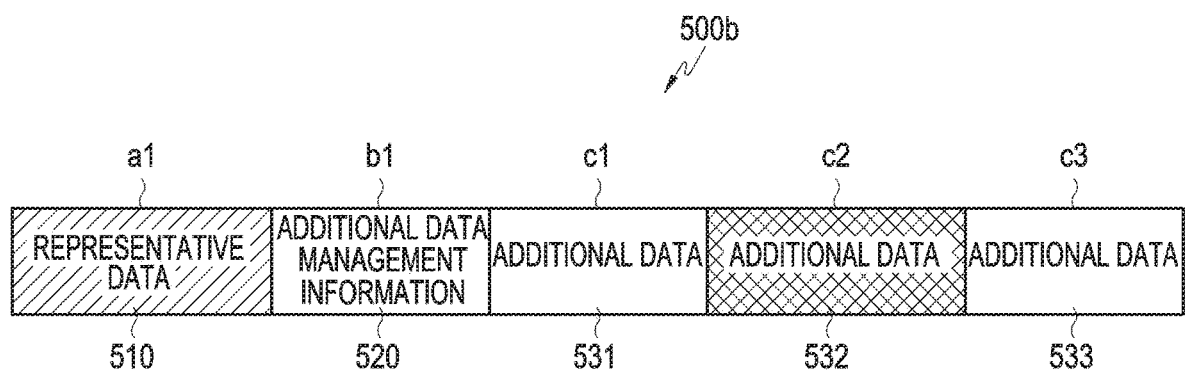
Figure 5C:
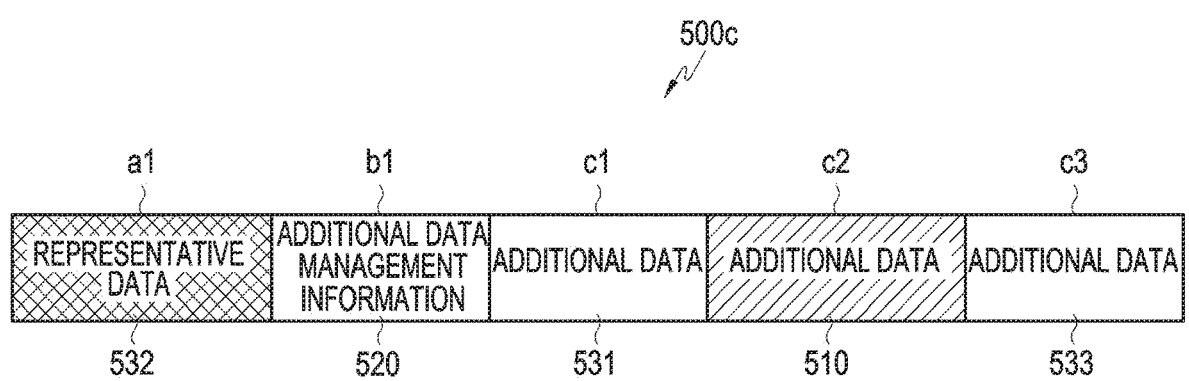
Figure 5D:
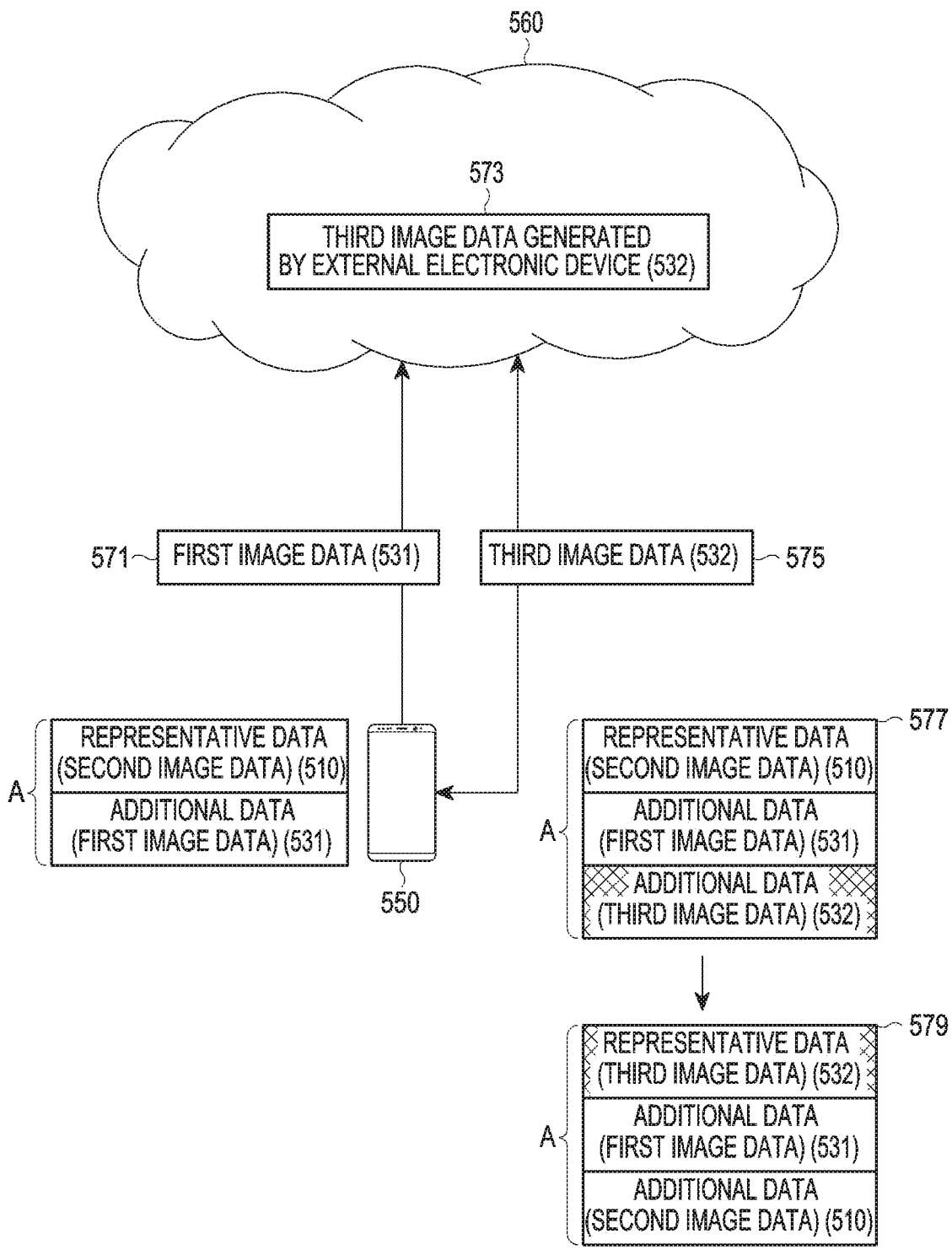
Figure 5E:
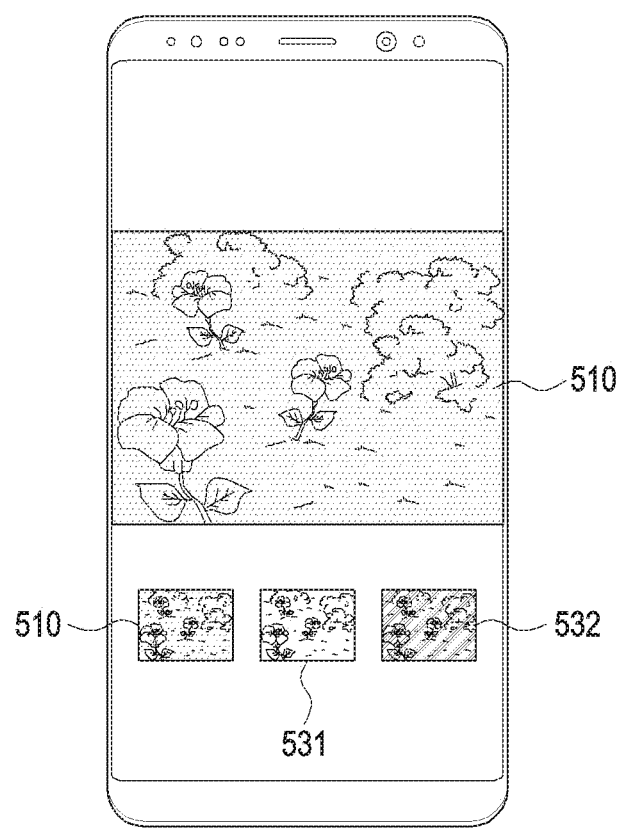
Figure 5F:
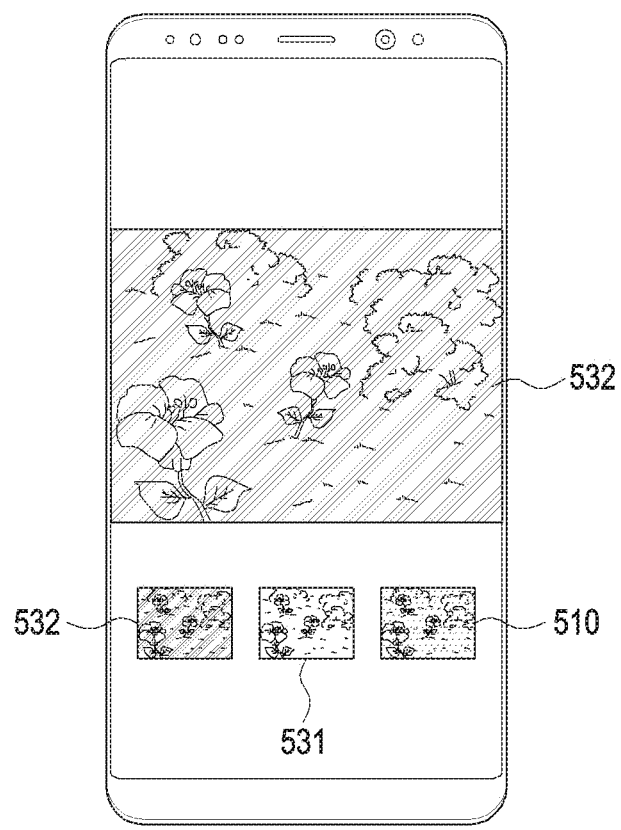

FIGS. 5A, 5B, 5C, 5D, 5E, and 5F are views illustrating the operation of changing data by an electronic device according to various embodiments of the disclosure. FIGS. 5A, 5B and 5C are views illustrating an example of changing representative data in a package file structure. FIG. 5D is a view illustrating the operation of processing data received from an external electronic device by an electronic device. FIGS. 5E and 5F are views illustrating the operation of displaying data of a package file in an image viewer.

Referring to FIGS. 5A, 5B and 5C, upon obtaining first image data 531 corresponding to raw image data generated via an image sensor (e.g., the image sensor 321 of FIG. 1) of a camera module (e.g., the camera module 380 of FIG. 1) and obtaining second image data 510 resulting from correcting the first image data 531 via an ISP (e.g., the ISP 323 of FIG. 1) of the camera module (e.g., the camera module 380 of FIG. 1), an electronic device (e.g., the electronic device 320, the file manager 326, or the processor 325 of FIG. 3) may generate a package file 500a which stores the second image data 510, as representative data, in a representative area a1, the first image data 531, as additional data, in an additional area c1, and additional data management information 520 in an additional data management area b1, as shown in FIG. 5A.

Referring to FIG. 5B, the electronic device (e.g., the electronic device 320, the file manager 326, or the processor 325 of FIG. 3) may transmit the first image data 531 to an external electronic device (e.g., the external electronic device 330 of FIG. 3) and, upon receiving third image data 532 resulting from the first image data 531 and correction information 533 for the third image data from the external electronic device, generate a package file 500b which stores the third image data 532, as additional data, in the additional area c2 and the correction information 533 for the third image data, as additional data, in the additional area c3.

Referring to FIG. 5C, upon receiving a command to change representative data by the user's selection, the electronic device (e.g., the electronic device 320, the file manager 326, or the processor 325 of FIG. 3) may generate a package file 500c which stores the third image data 532 in the representative area a1 and the second image data 510 in the additional area c2.

Referring to FIG. 5D, in a package file A which stores the second image data 510 resulting from correcting the first image data 531 by the electronic device 550 (e.g., the electronic device 320 of FIG. 3), as representative data, and the first image data 531 corresponding to the raw image data as additional data, the electronic device (e.g., the electronic device 320, the file manager 326, or the processor 325 of FIG. 3) may transit the first image data 531 to the external electronic device 560 (e.g., the external electronic device 330 of FIG. 3) (operation 571). The external electronic device 560 may generate third image data 532 by correcting the first image data 531 received from the electronic device 550 using the ISP (e.g., the ISP 333 of FIG. 3) of the external electronic device (operation 573). The external electronic device 560 may transmit the third image data 532 to the electronic device 550 (operation 575). The electronic device 550 may store the third image data 532 received from the external electronic device 560, as additional data of the package file A (operation 577). The electronic device 550 may store the third image data 532, which is the result of correction by the external electronic device 560 in the package file A automatically or by the user's selection, as representative data, according to a preset representative data change condition and change the additional data to the second image data 510, which is the result of correction by the electronic device, and store the same (operation 579).

Referring to FIGS. 5E and 5F, the electronic device (e.g., the electronic device 320, the file manager 326, or the processor 325 of FIG. 3) may display the second image data 510, which is the representative data of the package file, as default image data, upon displaying the package file of, e.g., FIG. 5B, in the image viewer, as shown in FIG. 5E. The electronic device may display the first image data 531 and the third image data 532 stored as additional data, along with the second image data 510 stored as representative data according to the user's request and, upon receiving a command to change the representative data to the third image data 532, which is the result of correction by the external electronic device, according to the user's request, the electronic device may generate a package file which stores the third image data 532 in the representative area a1 and the second image data 510 in the additional area c2 as shown in FIG. 5C.

The electronic device (e.g., the electronic device 320, the file manager 326, or the processor 325 of FIG. 3) may display the third image data 532, which is the representative data of the package file, as default image data, upon displaying the package file of, e.g., FIG. 5C, in the image viewer, as shown in FIG. 5F. The electronic device may display the first image data 531 and the second image data 510, which are stored as additional data, along with the third image data 532 stored as the representative data according to the user's request.

Upon receiving the third image data 532, which is the result of correcting the first image data 531, and the correction information 533 for the third image data in the package file of, e.g., FIG. 5A, from the external electronic device under a preset representative data change condition, the electronic device (e.g., the electronic device 320, the file manager 326, or the processor 325 of FIG. 3) may store the third image data 532 in the representative area a1 and the second image data 510 in the additional area c2 as shown in FIG. 5C.

According to an embodiment, the electronic device (e.g., the electronic device 320, the file manager 326, or the processor 325 of FIG. 3) may set different access authorities for the representative data and the additional data, thereby generating the package file as shown in FIGS. 5A, 5B and 5C.

The electronic device (e.g., the electronic device 320, the file manager 326, or the processor 325 of FIG. 3) may control the encoding unit (e.g., the encoding unit 327a of FIG. 3) to differentially encode the additional data or additional data management information to allow a user with a specific authority to access.

The electronic device (e.g., the electronic device 320, the file manager 326, or the processor 325 of FIG. 3) may control the decoding unit (e.g., the decoding unit 327b of FIG. 3) to decode the additional data or additional data management information in the package file of, e.g., FIGS. 5A, 5B and 5C.

Figure 6A:
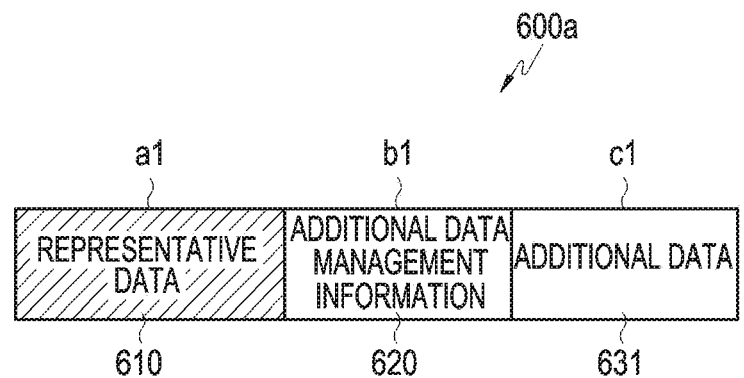
FIGS. 6A and 6B are views illustrating the operation of changing data by an electronic device according to various embodiments of the disclosure.
Figure 6B:
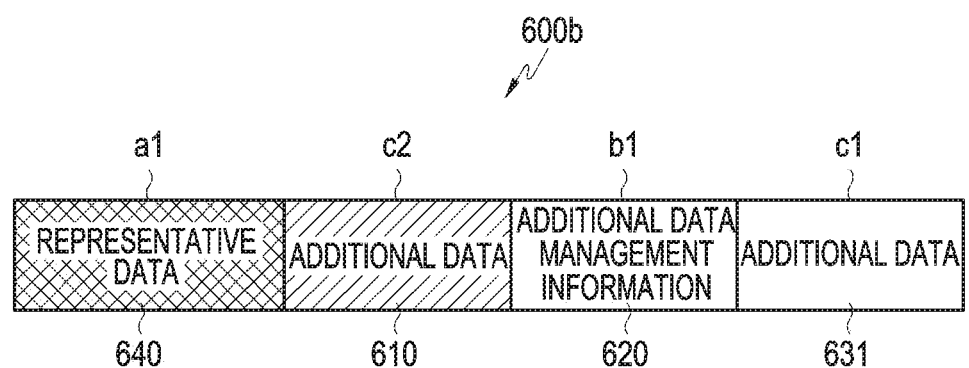

FIGS. 6A and 6B are views illustrating the operation of changing data by an electronic device according to various embodiments of the disclosure.

Referring to FIG. 6A, an electronic device (e.g., the electronic device 320, the file manager 326, or the processor 325 of FIG. 3) may generate new fourth image data 640 by editing second image data 610, which is representative data, in a package file 600a that stores the second image data 610 resulting as the electronic device corrects first image data corresponding to raw image data, as representative data, in a representative area a1, additional data management information 620 in an additional data management area b1, and the first image data 631 corresponding to the raw image data, as additional data, in an additional area c1.

Referring to FIG. 6B, if generating the new fourth image data 640 by editing the second image data 610 which is the representative data, the electronic device (e.g., the electronic device 320, the file manager 326, or the processor 325 of FIG. 3) may generate a package file 600b that stores the fourth image data 640, as representative data, in the representative area a1, the additional data management information 620 in the additional data management area b1, the second image data 610, as additional data, in the additional area c2, and the first image data 631 corresponding to the raw image data, as additional data, in the additional area c1. The electronic device may store edit information for the fourth image data 640 in the additional area of the package file 600b.

FIGS. 7A, 7B, 7C, 7D, and 7E are views illustrating the operation of changing data by an electronic device according to various embodiments of the disclosure.

Figure 7A:
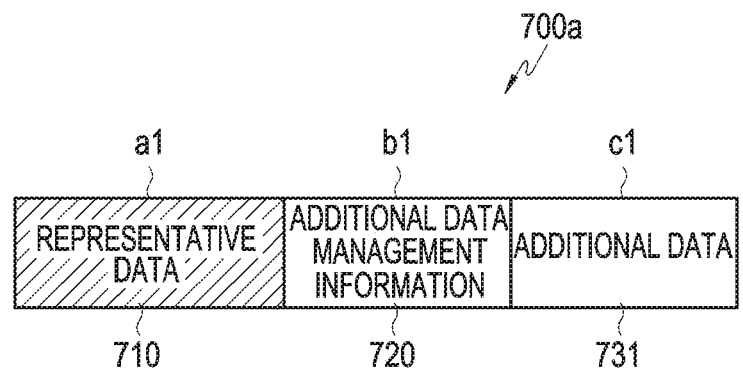
FIGS. 7A, 7B, 7C, 7D, and 7E are views illustrating the operation of changing data by an electronic device according to various embodiments of the disclosure.

Referring to FIG. 7A, an electronic device (e.g., the electronic device 320, the file manager 326, or the processor 325 of FIG. 3) may generate edit area image data 710-1 corresponding to a portion of second image data 710, which is representative data, by editing (e.g., modifying, deleting, or adding) the portion of the second image data 710 in a package file 700a that stores the second image data 710 resulting as the electronic device corrects first image data 731 corresponding to raw image data, as representative data, in a representative area a1, additional data management information 720 in an additional data management area b1, and the first image data 731 corresponding to the raw image data, as additional data, in an additional area c1. The edit area image data 710-1 corresponding to the portion of the second image data 710 may be generated by the electronic device 320 or may be received from an external electronic device 330.

Figure 7B:
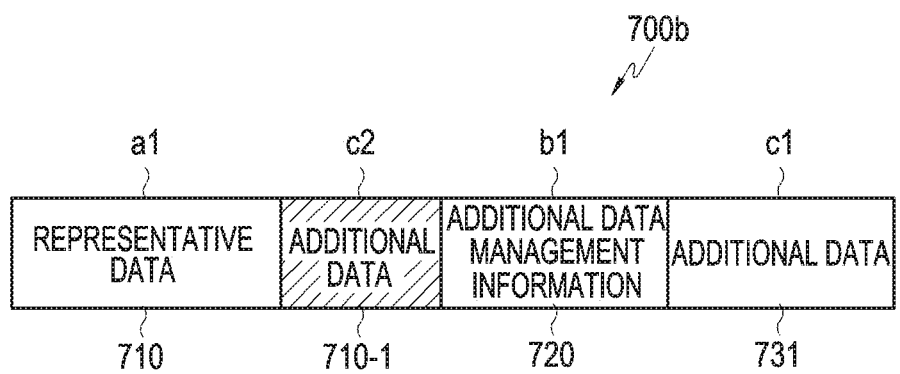

Referring to FIG. 7B, the electronic device (e.g., the electronic device 320, the file manager 326, or the processor 325 of FIG. 3) may generate a package file 700b that stores the second image data 710, as representative data, in the representative area a1, the edit area image data 710-1 corresponding to the portion of the second image data 710, as additional data, in the additional area c2, the additional data management information 720 in the additional data management area b1, and the first image data 731, as additional data, in the additional area c1.

Figure 7C:
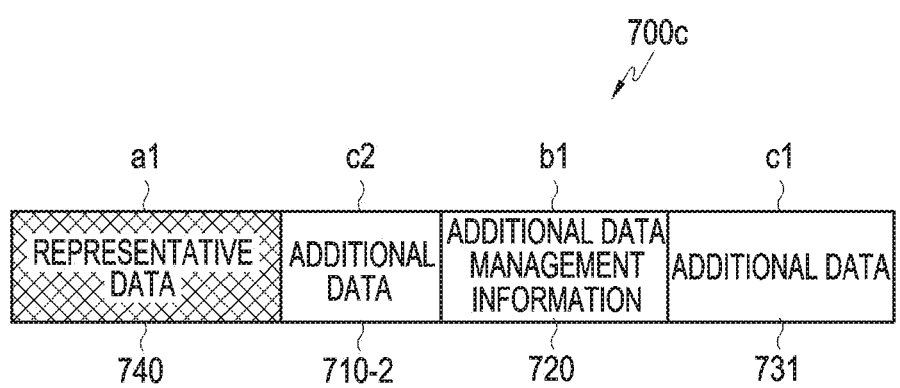

Referring to FIG. 7C, upon receiving a representative data change command by the user's selection, the electronic device (e.g., the electronic device 320, the file manager 326, or the processor 325 of FIG. 3) may generate new fifth image data 740 by synthesizing the edit area image data 710-1 and the portion of the second image data 710 and generate a package file 700c that stores the fifth image data 740, as representative data, in the representative area a1, the pre-editing edit area image data 710-2 corresponding to the portion of the second image data 710, as additional data, in the additional area c2, the additional data management information 720 in the additional data management area b1, and the first image data 731, as additional data, in the additional area c1.

Figure 7D:
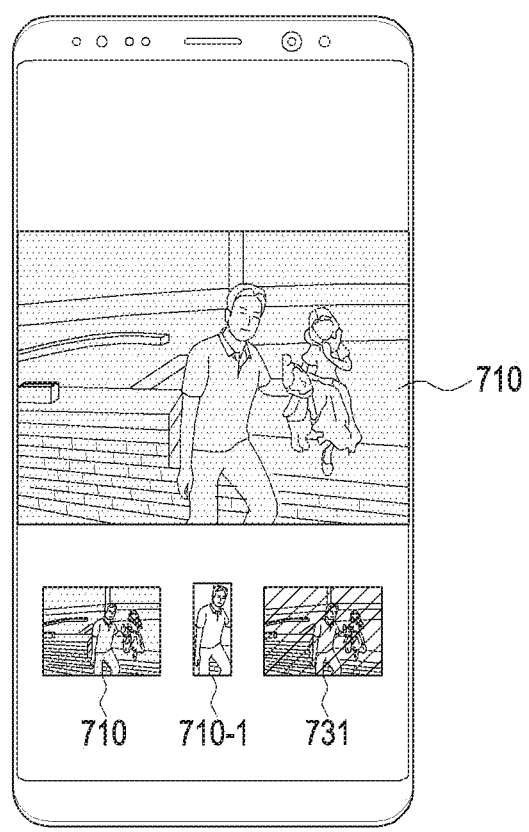

The electronic device (e.g., the electronic device 320, the file manager 326, or the processor 325 of FIG. 3) may display the second image data 710, which is the representative data of the package file, as default image data, upon displaying the package file of, e.g., FIG. 7B, in the image viewer, referring to FIG. 7D. The electronic device may display the edit area image data 710-1 and/or the first image data 731, which are stored as additional data, along with the second image data 710 stored as the representative data according to the user's request. Upon receiving a command to apply the edit area image data 710-1 as representative data by the user's selection, the electronic device may generate new fifth image data 740 by synthesizing the edit area image data 710-1 with the portion of the second image data 710 and generate a package file that stores the fifth image data 740, as representative data, in the representative area a1 and the pre-editing edit area image data 710-2 corresponding to the portion of the second image data 710, as additional data, in the additional area c2 as shown in FIG. 7C.

Figure 7E:
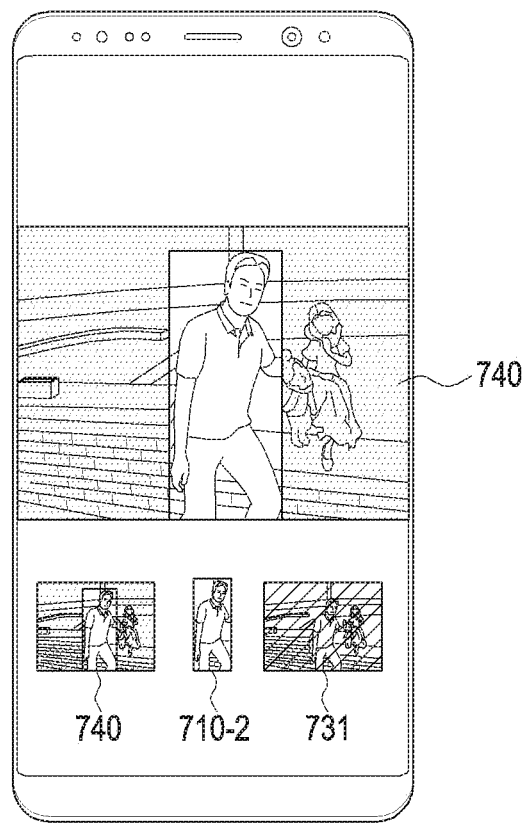

The electronic device (e.g., the electronic device 320, the file manager 326, or the processor 325 of FIG. 3) may display the new fifth image data 740, which is the representative data of the package file, as default image data, upon displaying the package file of, e.g., FIG. 7C, in the image viewer, referring to FIG. 7E. The electronic device may display the pre-editing edit area image data 710-2 and the first image data 731, which are stored as additional data, along with the new fifth image data 740 stored as representative data according to the user's request.

If the new fifth image data 740 is generated by editing the portion of the second image data 710, which is the representative data, in the package file of, e.g., FIG. 7A according to a preset representative data change condition, the electronic device (e.g., the electronic device 320, the file manager 326, or the processor 325 of FIG. 3) may store the new fifth image data 740 in the representative area a1 and the pre-editing edit area image data 710-2 in the additional area c2 as shown in FIG. 7C.

Figure 8A:
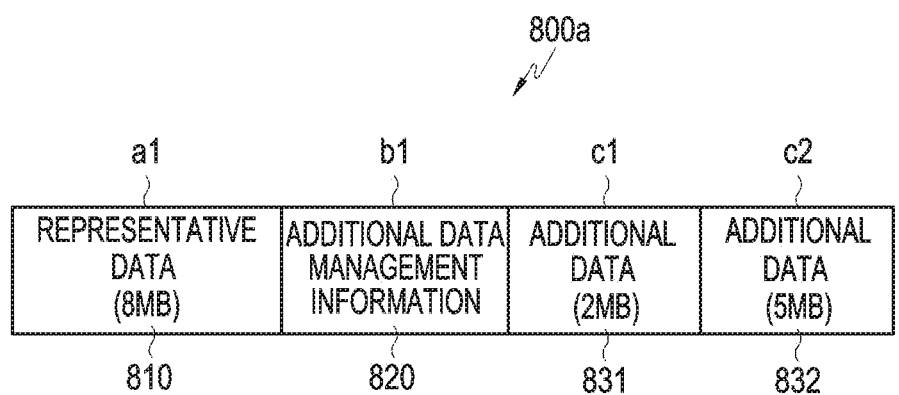
FIGS. 8A and 8B are views illustrating the operation of changing data by an electronic device according to various embodiments of the disclosure.
Figure 8B:
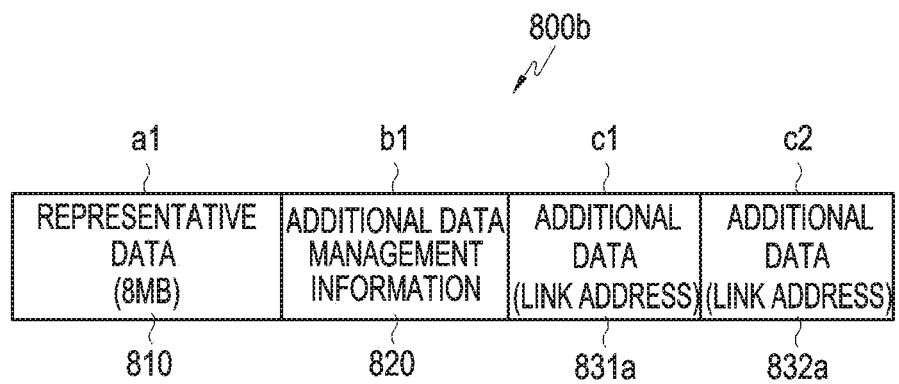

FIGS. 8A and 8B are views illustrating the operation of changing data by an electronic device according to various embodiments of the disclosure.

Referring to FIG. 8A, an electronic device (e.g., the electronic device 320, the file manager 326, or the processor 325 of FIG. 3) may generate a package file 800a that stores third image data 810, which is the result of correction of first image data 831 corresponding to raw image data by the external electronic device 330, as representative data, in the representative area a1, additional data management information 820 in the additional data management area b1, the first image data 831 corresponding to the raw image data, as additional data, in the additional area c1, and second image data 832, which is the result of correction of the first image data 831 corresponding to the raw image data by the electronic device 320, as additional data, in the additional area c2.

Referring to FIG. 8B, if the electronic device (e.g., the electronic device 320, the file manager 326, or the processor 325 of FIG. 3) receives a command to reduce the size of the package file by the user's selection or the size of the package file is a threshold or more, the electronic device may store the 2 MB image data 831, which is stored as additional data in the additional area c1, in the external electronic device 330 and the 5 MB image data 832, which is stored as additional data in the additional area c2, in the external storage device 330. The electronic device may generate a package file 800b that stores the 8 MB image data 810, as representative data, in the representative area a1, the additional data management information 820 in the additional data management area b1, the location address (e.g., the link address) 831a of the external electronic device 330, where the image data 831 is stored instead of the 2 MB image data 831, as additional data, in the additional area c1, and the location address (e.g., the link address) 832a of the external electronic device 330, where the image data 832 is stored instead of the 5 MB image data 832, as additional data, in the additional area c2 in the external electronic device 330, thereby reducing the size of the package file. If the pieces of additional data stored in the package file include a plurality of pieces of additional data which are the same or overlap each other, the electronic device (e.g., the electronic device 320, the file manager 326, or the processor 325 of FIG. 3) may delete the other pieces of additional data than one piece of additional data, store the non-deleted piece of additional data in the external electronic device 330, and store the location address of the external electronic device, where the non-deleted piece of additional data is stored, instead of the non-deleted piece of additional data, in the additional area.

According to an embodiment, an electronic device (e.g., the electronic device 101 of FIG. 1 or the electronic device 320 of FIG. 3) may comprise a housing (e.g., the housing 280 of FIG. 2B), a wireless communication circuit (e.g., the communication module 190 of FIG. 1), a camera (e.g., the camera module 180 of FIG. 2) exposed through the housing, at least one processor (e.g., the processor 120 of FIG. 1 or the processor 325 of FIG. 3) operatively connected with the wireless communication circuit and the camera, and a memory (e.g., the memory 130 of FIG. 1 or the memory 328 of FIG. 3) operatively connected with the processor image data, wherein the memory stores instructions configured, when executed, to enable the processor to process first image data (e.g., the first image data 531 of FIG. 5A) corresponding to raw image data, the raw image data (e.g., the raw image data 322 of FIG. 3) generated by the camera and stored in the memory, via a first algorithm to generate second image data (e.g., the second image data 510 of FIG. 5A), process the first image data or the second image data via a second algorithm different from the first algorithm to generate third image data (e.g., the third image data 532 of FIG. 5B), generate a first file (e.g., the package file 500b of FIG. 5B) including the second image data and the third image data in a payload, receive priority information from an external electronic device (e.g., the first electronic device 340 of FIG. 3) via the wireless communication circuit, generate a second file (e.g., the package file 500c of FIG. 5C) including the second image data and the third image data in a payload based on the priority information, and transmit the second file via the wireless communication circuit to the external electronic device.

According to an embodiment, the first algorithm may differ from the second algorithm in at least one of filter, compression scheme, resolution, or image format.

According to an embodiment, the instructions may enable the processor (e.g., the processor 120 of FIG. 1 or the processor 325 of FIG. 3) to generate management data and add the management data to the first file, the management data including an identification code for identifying whether there is a transformation for processing at least one of the first image data, the second image data, or the third image data, a read and/or write authority, a distribute authority, whether encoded or not, kind of encoding, or copyright-related data.

According to an embodiment, the instructions may enable the processor (e.g., the processor 120 of FIG. 1 or the processor 325 of FIG. 3) to generate management data and add the management data to the second file, the management data including an identification code for identifying whether there is a transformation for processing at least one of the second image data or the third image data, a read and/or write authority, a distribute authority, whether encoded or not, kind of encoding, or copyright-related data.

According to an embodiment, the priority information received from the external electronic device may include information for at least one of a filter, compression scheme, resolution, or image format for the external electronic device to process image data.

According to an embodiment, the instructions may enable the processor (e.g., the processor 120 of FIG. 1 or the processor 325 of FIG. 3) to receive fourth image data related to at least one of the first image data, the second image data, or the third image data from the external electronic device and include the fourth image data in the payload of the first file.

According to an embodiment, the instructions may enable the processor (e.g., the processor 120 of FIG. 1 or the processor 325 of FIG. 3) to generate fifth image data by editing at least one of the first image data, the second image data, or the third image data and include the fifth image data in the payload of the first file.

According to an embodiment, the instructions may enable the processor (e.g., the processor 120 of FIG. 1 or the processor 325 of FIG. 3) to store at least one of a plurality of pieces of image data included in the payload of the first file in the external electronic device and store a location address of the at least one piece of image data stored in the external electronic device in the payload of the first file.

According to an embodiment, the instructions may enable the processor (e.g., the processor 120 of FIG. 1 or the processor 325 of FIG. 3) to set one of the plurality of pieces of image data included in the first file as representative data.

According to an embodiment, the instructions may enable the processor (e.g., the processor 120 of FIG. 1 or the processor 325 of FIG. 3) to transmit priority information for the electronic device to the external electronic device via the wireless communication circuit, receive a third file including a plurality of pieces of image data in a payload from the external electronic device based on the priority information for the electronic device, and store the third file.

Figure 9:
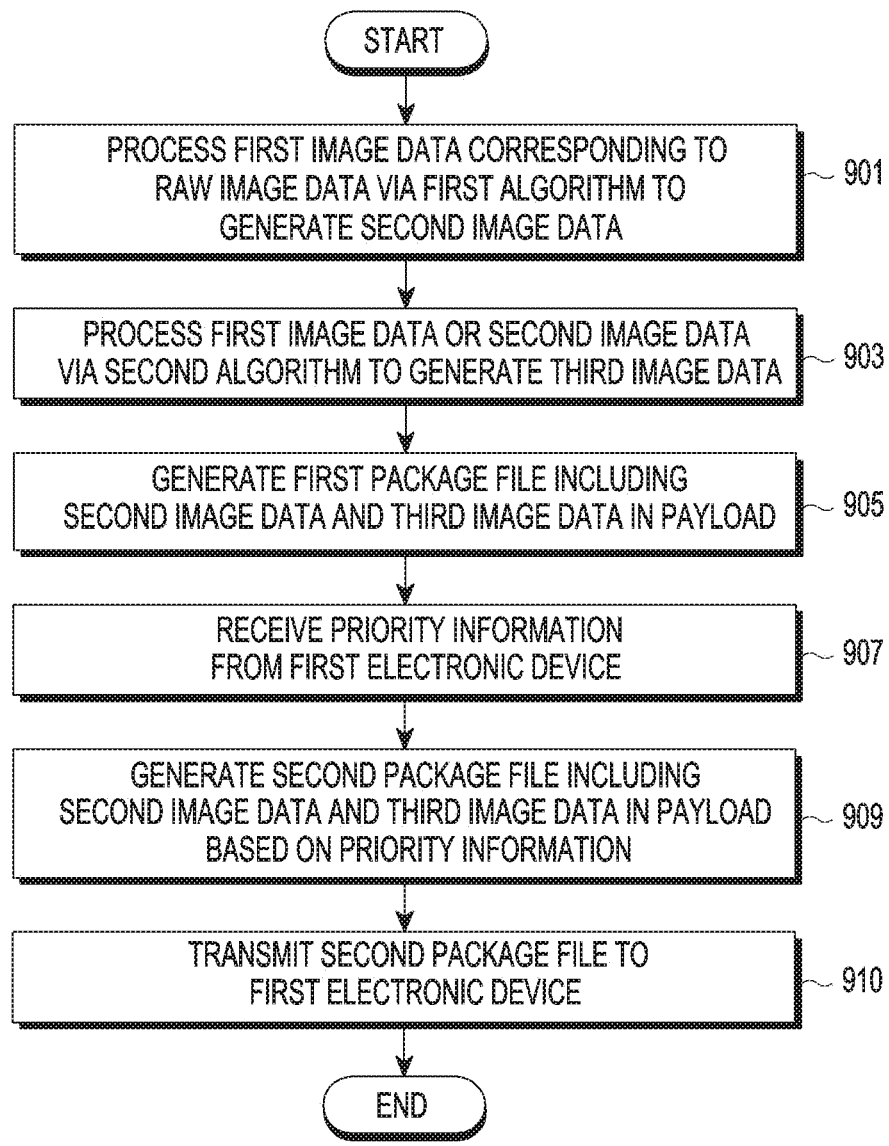
FIG. 9 is a flowchart illustrating the operation of changing data by an electronic device according to an embodiment of the disclosure.

FIG. 9 is a flowchart illustrating the operation of changing data by an electronic device according to an embodiment of the disclosure. The data change operation may include operations 901 to 910. The data change operation may be performed by an electronic device (e.g., the electronic device 101 of FIG. 1, the electronic device 270 of FIG. 2B, or the electronic device 320 of FIG. 3) or at least one processor (e.g., the processor 120 of FIG. 1 or the processor 325 of FIG. 3) of the electronic device. According to an embodiment, at least one of operations 901 to 910 may be omitted or changed in order or may add other operations.

Referring to FIG. 9, in operation 901, an electronic device (e.g., the electronic device 320, the file manager 326, or the processor 325 of FIG. 3) may obtain first image data corresponding to raw image data by an image sensor (e.g., the image sensor 321 of FIG. 3) of a camera module (e.g., the camera module 380 of FIG. 3) via a first algorithm, thereby generating second image data.

In operation 903, the electronic device (e.g., the electronic device 320, the file manager 326, or the processor 325 of FIG. 3) may process the first image data or the second image data via a second algorithm, thereby generating third image data. The second algorithm may differ from the first algorithm, and the first algorithm and the second algorithm may differ in at least one of filter, compression scheme, resolution, or image format.

In operation 905, the electronic device (e.g., the electronic device 320, the file manager 326, or the processor 325 of FIG. 3) may generate a first package file which includes the second image data and the third image data in the payload.

In operation 907, the electronic device (e.g., the electronic device 320, the file manager 326, or the processor 325 of FIG. 3) may receive priority information from a first electronic device (e.g., the electronic device 102 or 104 of FIG. 1 or the first electronic device 340 of FIG. 3) via the wireless communication circuit (e.g., the communication module 190 of FIG. 1). The priority information may include information for at least one of a filter, compression scheme, resolution, or image format for the first electronic device to process the image data.

In operation 909, the electronic device (e.g., the electronic device 320, the file manager 326, or the processor 325 of FIG. 3) may generate a second package file which includes the second image data and the third image data in the payload based on the priority information.

In operation 910, the electronic device (e.g., the electronic device 320, the file manager 326, or the processor 325 of FIG. 3) may transmit the second package file to the first electronic device via the wireless communication circuit (e.g., the communication module 190 of FIG. 1).

Figure 10:
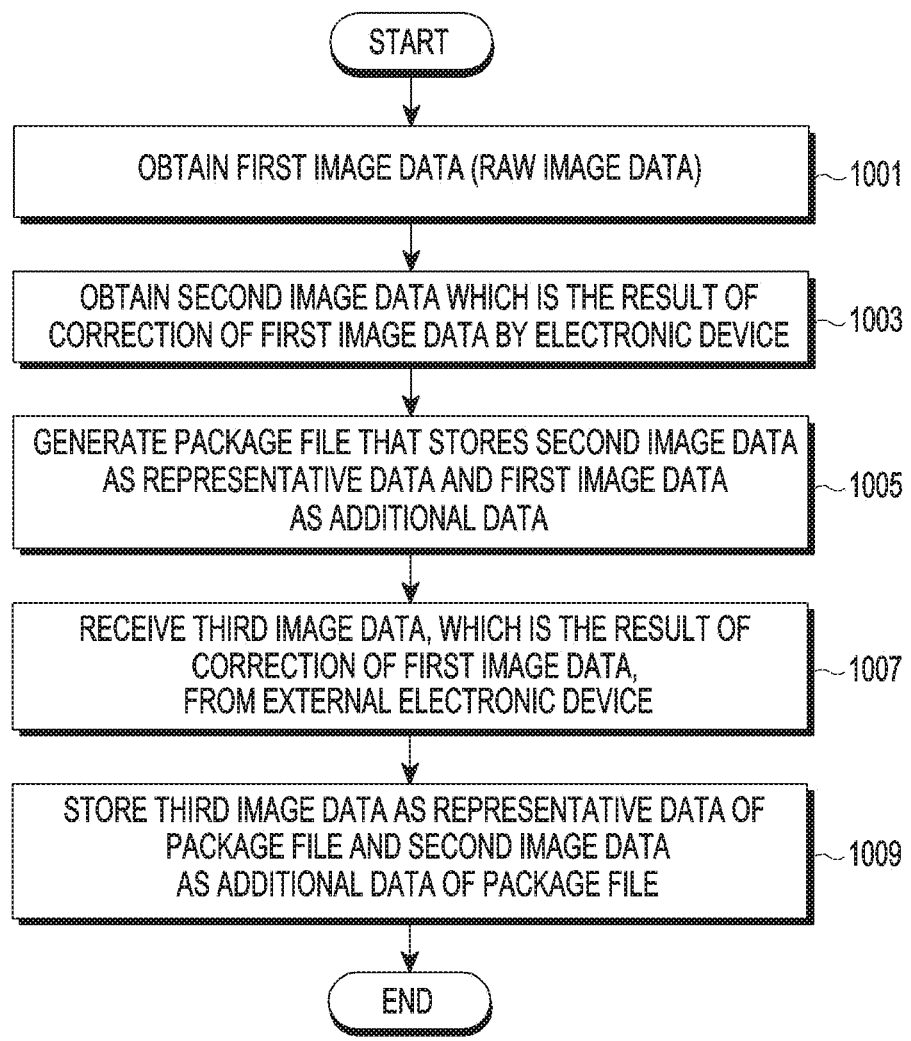
FIG. 10 is a flowchart illustrating the operation of changing data by an electronic device according to an embodiment of the disclosure.

FIG. 10 is a flowchart illustrating the operation of changing data by an electronic device according to an embodiment of the disclosure. The data change operation may include operations 1001 to 1009. The data change operation may be performed by an electronic device (e.g., the electronic device 101 of FIG. 1, the electronic device 270 of FIG. 2B, or the electronic device 320 of FIG. 3) or at least one processor (e.g., the processor 120 of FIG. 1 or the processor 325 of FIG. 3) of the electronic device. According to an embodiment, at least one of operations 1001 to 1009 may be omitted or changed in order or may add other operations.

Referring to FIG. 10, in operation 1001, an electronic device (e.g., the electronic device 320, the file manager 326, or the processor 325 of FIG. 3) may obtain first image data corresponding to raw image data by an image sensor (e.g., the image sensor 321 of FIG. 3) of a camera module (e.g., the camera module 380 of FIG. 3).

In operation 1003, the electronic device (e.g., the electronic device 320, the file manager 326, or the processor 325 of FIG. 3) may generate second image data which is the result of correcting the first image data via the ISP (e.g., the ISP 323 of FIG. 1) of the camera module (e.g., the camera module 380 of FIG. 1).

In operation 1005, the electronic device (e.g., the electronic device 320, the file manager 326, or the processor 325 of FIG. 3) may generate a package file that stores the second image data resulting from correction by the electronic device (e.g., the electronic device 320 of FIG. 3), as representative data, and the first image data corresponding to the raw image data as additional data. The package file may contain additional data management information.

In operation 1007, the electronic device (e.g., the electronic device 320, the file manager 326, or the processor 325 of FIG. 3) may receive third image data resulting from correcting the first image data corresponding to the raw image data from an external electronic device (e.g., the external electronic device 330 of FIG. 3).

In operation 1009, the electronic device (e.g., the electronic device 320, the file manager 326, or the processor 325 of FIG. 3) may generate a package file that stores the third image data resulting from correction by the external electronic device (e.g., the external electronic device 330 of FIG. 3), as representative data, and the first image data and second image data as additional data. Upon receiving the third image data from the external electronic device (e.g., the external electronic device 330 of FIG. 3), the electronic device may change and set the representative data of the package file to the third image data according to the preset representative data change condition. Upon receiving the third image data from the external electronic device (e.g., the external electronic device 330 of FIG. 3), the electronic device may store the third image data as the additional data of the package file and, by the user's selection, change the representative data of the package file to the third image data.

Figure 11A:
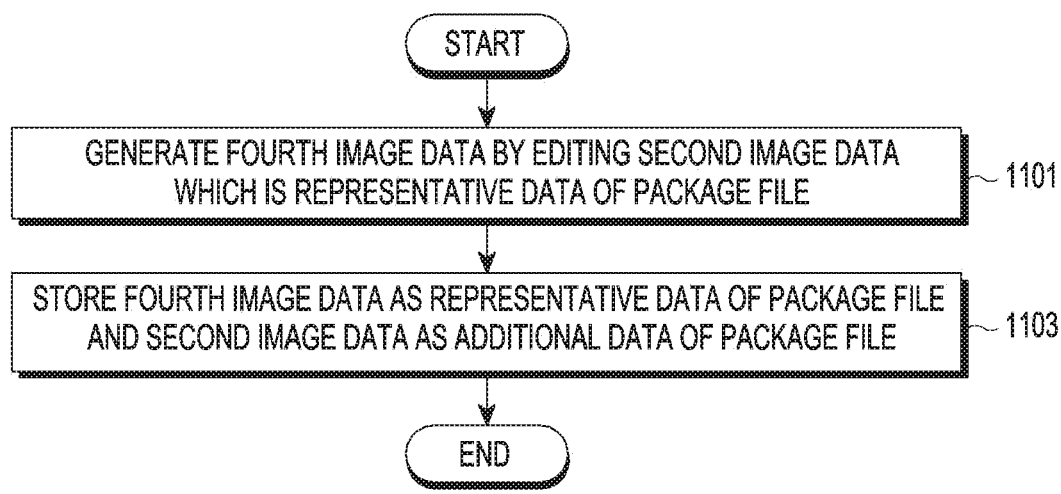
FIG. 11A is a flowchart illustrating the operation of changing data by an electronic device according to an embodiment of the disclosure.

FIG. 11A is a flowchart illustrating the operation of changing data by an electronic device according to an embodiment of the disclosure. The data change operation may include operations 1101 to 1103. The data change operation may be performed by an electronic device (e.g., the electronic device 101 of FIG. 1, the electronic device 270 of FIG. 2B, or the electronic device 320 of FIG. 3) or at least one processor (e.g., the processor 120 of FIG. 1 or the processor 325 of FIG. 3) of the electronic device. According to an embodiment, at least one of operations 1101 to 1103 may be omitted or changed in order or may add other operations.

Referring to FIG. 11A, in operation 1101, the electronic device (e.g., the electronic device 320, the file manager 326, or the processor 325 of FIG. 3) may generate new fourth image data by editing second image data corresponding to representative data in a package file that stores second image data, which is the result of correction of first image data corresponding to raw image data by the electronic device, as representative data and the first image data corresponding to the raw image data as additional data.

In operation 1103, the electronic device (e.g., the electronic device 320, the file manager 326, or the processor 325 of FIG. 3) may generate a package file that stores the fourth image data as the representative data of the package file and the second image data as additional data. If the new fourth image data is generated by editing the second image data, the electronic device may change the representative data of the package file to the fourth image data without storing it as additional data according to a preset representative data change condition. If the new fourth image data is generated by editing the second image data, the electronic device may store the fourth image data as the additional data of the package file and, by the user's selection, change and set the representative data of the package file to the fourth image data.

Figure 11B:
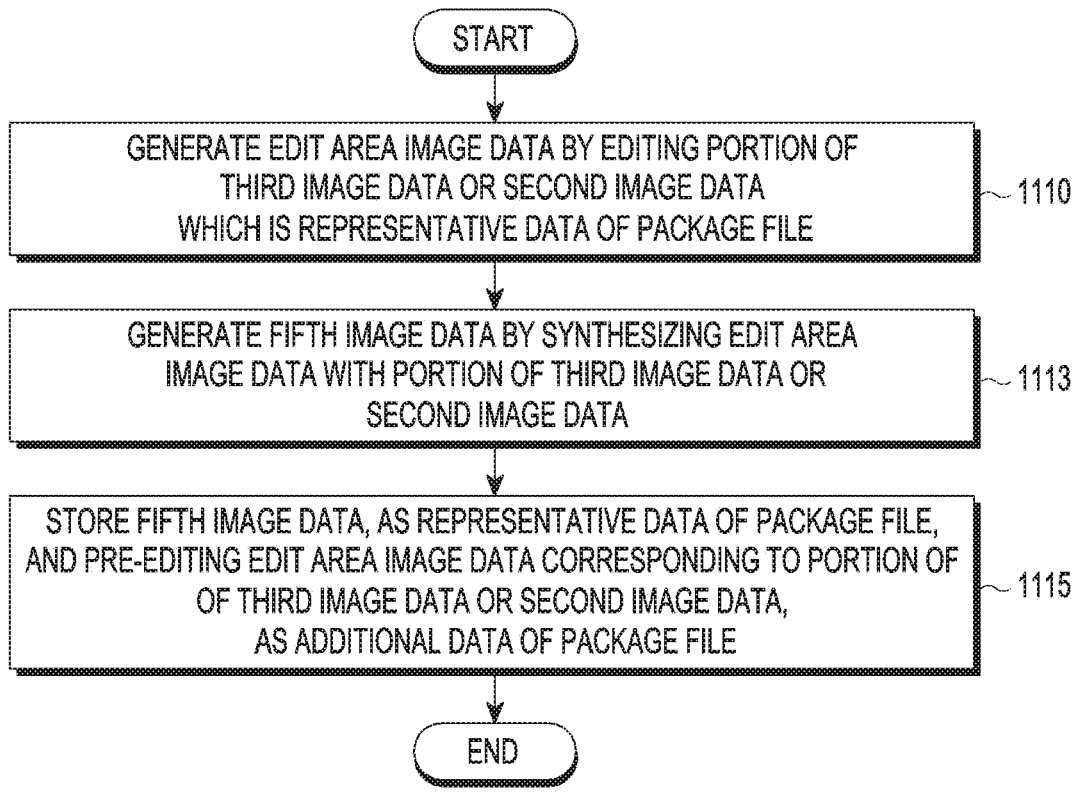
FIG. 11B is a flowchart illustrating the operation of changing data by an electronic device according to an embodiment of the disclosure.

FIG. 11B is a flowchart illustrating the operation of changing data by an electronic device according to an embodiment of the disclosure. The data change operation may include operations 1110 to 1115. The data change operation may be performed by an electronic device (e.g., the electronic device 101 of FIG. 1, the electronic device 270 of FIG. 2B, or the electronic device 320 of FIG. 3) or at least one processor (e.g., the processor 120 of FIG. 1 or the processor 325 of FIG. 3) of the electronic device. According to an embodiment, at least one of operations 1110 to 1115 may be omitted or changed in order or may add other operations.

Referring to FIG. 11B, in operation 1110, the electronic device (e.g., the electronic device 320, the file manager 326, or the processor 325 of FIG. 3) may generate edit area image data corresponding to a portion of second image data by editing the portion of the second image data corresponding to representative data in a package file that stores second image data, which is the result of correction of first image data corresponding to raw image data by the electronic device, as representative data and the first image data corresponding to the raw image data as additional data.

In operation 1113, the electronic device (e.g., the electronic device 320, the file manager 326, or the processor 325 of FIG. 3) may generate new fifth image data by synthesizing the portion of the second image data with the corresponding edit area image data.

In operation 1115, the electronic device (e.g., the electronic device 320, the file manager 326, or the processor 325 of FIG. 3) may store the fifth image data as representative data and the pre-editing edit area image data corresponding to the portion of the second image data as additional data.

If the edit area image data corresponding to the portion of the second image data is generated according to a preset representative data change condition, the electronic device may generate the new fifth image data by synthesizing the edit area image data with the portion of the second image data without storing it as additional data and may store the fifth image data as representative data. If the edit area image data corresponding to the portion of the second image data is generated, the electronic device may store the edit area image data as the additional data of the package file and, if the user's request is received to synthesize the edit area image data with the portion of the second image data, generate new fifth image data by synthesizing the edit area image data with the portion of the second image data and store the fifth image data as the representative data.

Figure 12:
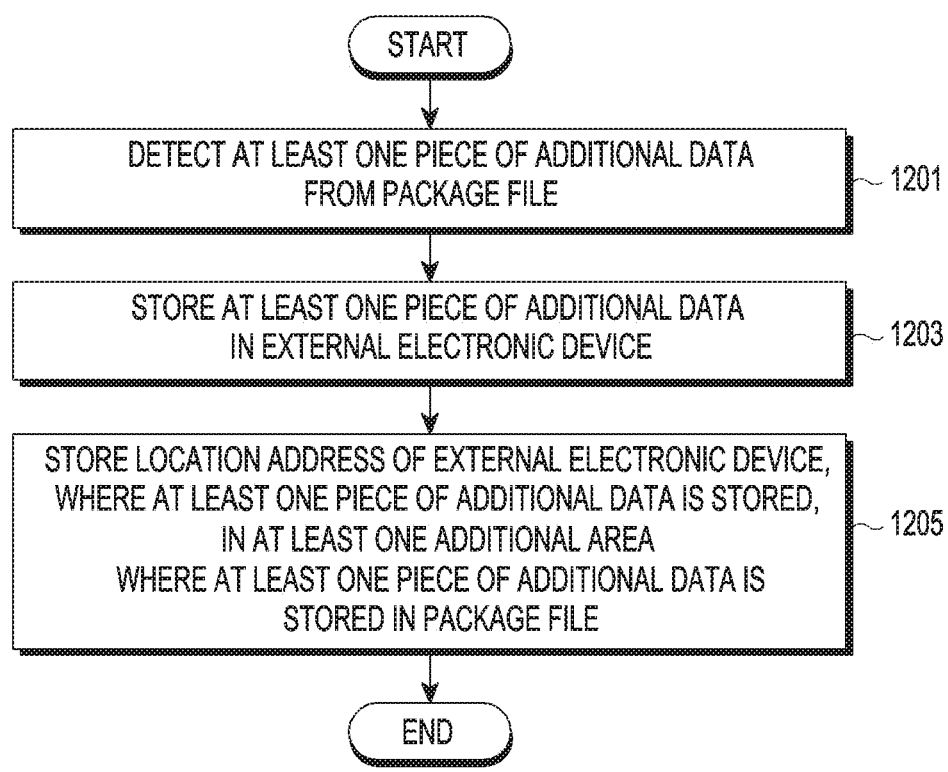
FIG. 12 is a flowchart illustrating the operation of changing data by an electronic device according to an embodiment of the disclosure.

FIG. 12 is a flowchart illustrating the operation of changing data by an electronic device according to an embodiment of the disclosure. The data change operation may include operations 1201 to 1205. The data change operation may be performed by an electronic device (e.g., the electronic device 101 of FIG. 1, the electronic device 270 of FIG. 2B, or the electronic device 320 of FIG. 3) or at least one processor (e.g., the processor 120 of FIG. 1 or the processor 325 of FIG. 3) of the electronic device. According to an embodiment, at least one of operations 1201 to 1205 may be omitted or changed in order or may add other operations.

Referring to FIG. 12, in operation 1201, upon receiving a command to reduce the size of a package file, an electronic device (e.g., the electronic device 320, the file manager 326, or the processor 325 of FIG. 3) may detect at least one piece of additional data from a package file that includes representative data, additional data management information. The at least one piece of additional data may include additional data selected by the user or additional data stored as image data.

If the size of the package file is a threshold or more, the electronic device may detect at least one piece of additional data so that the size of the package file may be the threshold or less.

In operation 1203, the electronic device (e.g., the electronic device 320, the file manager 326, or the processor 325 of FIG. 3) may store the at least one detected piece of data in an external electronic device (e.g., the external electronic device 330 of FIG. 3).

In operation 1205, the electronic device (e.g., the electronic device 320, the file manager 326, or the processor 325 of FIG. 3) may delete the at least one detected piece of data from at least one additional area, where the at least one detected piece of data is stored in the package file, and store location information (e.g., link information) for the external electronic device, where the at least one piece of additional data is stored, in the at least one additional area.

Figure 13:
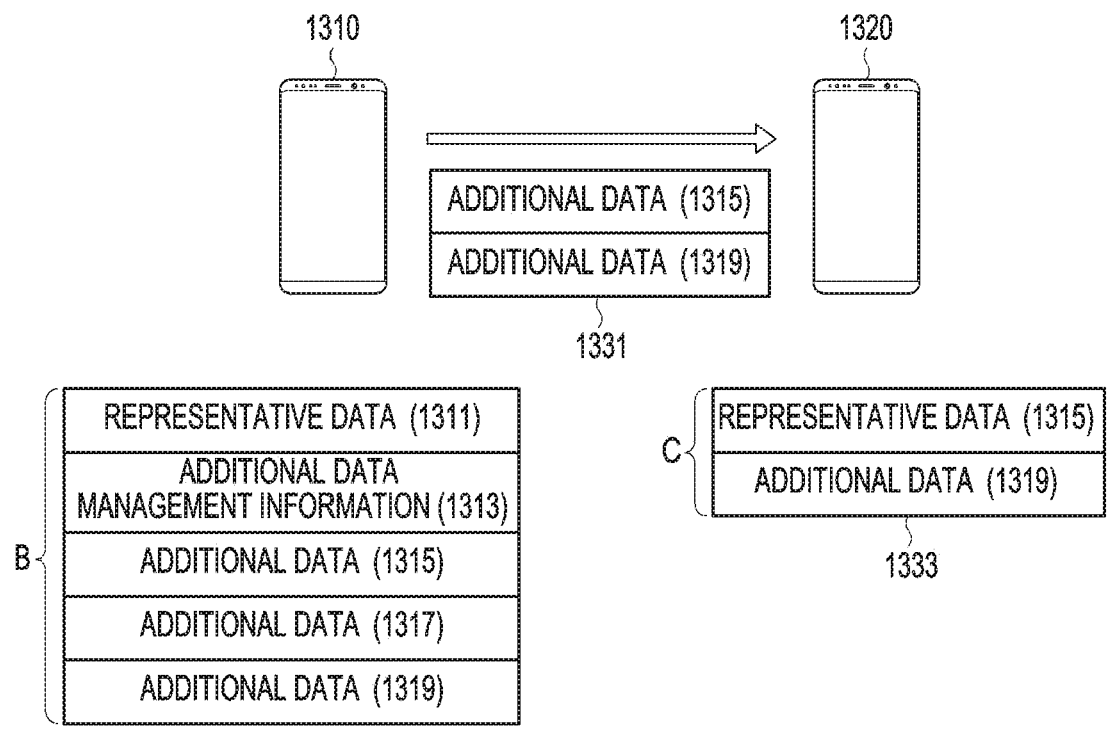
FIG. 13 is a view illustrating the operation of transmitting data by an electronic device according to an embodiment of the disclosure.

FIG. 13 is a view illustrating the operation of transmitting data by an electronic device according to an embodiment of the disclosure.

Referring to FIG. 13, an electronic device 1310 (e.g., the electronic device 320 of FIG. 3) may transmit a plurality of pieces of additional data 1315 and 1319, which are selected by the user from a package file B including representative data 1311, additional data management information 1313, and a plurality of pieces of additional data 1315 to 1319, to a first electronic device 1320 (e.g., the electronic device 102 or 104 of FIG. 1) (operation 1331).

Upon receiving the plurality of pieces of additional data 1315 and 1319 from the electronic device 1310, the first electronic device 1320 (e.g., the electronic device 102 or 104 of FIG. 1) may generate a package file C that stores the image data 1315 of the plurality of pieces of additional data 1315 and 1319 as representative data and the other additional data 1319 as additional data (operation 1333). As an example, if the plurality of pieces of additional data 1315 and 1319 are image data, the first electronic device 1320 may store the image data selected by the user as representative data. The first electronic device 1320 may have substantially the same configuration and perform substantially the same function as the electronic device 1310 (e.g., the electronic device 320 of FIG. 3).

Figure 14:
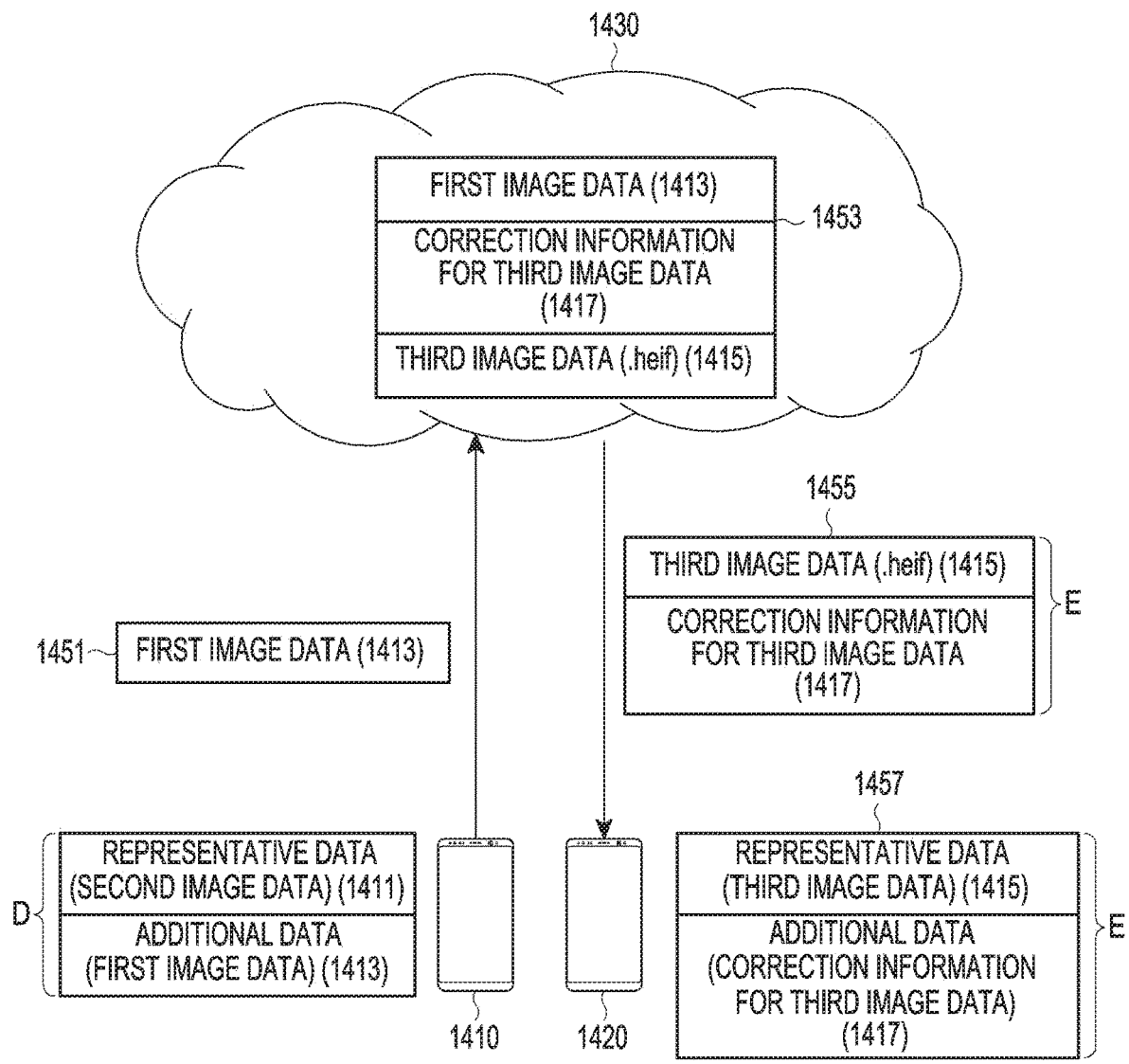
FIG. 14 is a view illustrating the operation of transmitting data by an electronic device according to an embodiment of the disclosure.

FIG. 14 is a view illustrating the operation of transmitting data by an electronic device according to an embodiment of the disclosure.

Referring to FIG. 14, an electronic device 1410 (e.g., the electronic device 320 of FIG. 3) may transmit, to an external electronic device 1430 (e.g., the external electronic device 330 of FIG. 3), first image data 1413 corresponding to raw image data in a package file D that stores second image data 1411, which is the result of correction of the first image data 1413 by the electronic device 1410, as representative data and the first image data 1413 corresponding to the raw image data as additional data, and the electronic device 1410 may request the external electronic device 1430 to transmit third image data 1415, which is the result of correction of the first image data 1413 by the external electronic device 1430, to a first electronic device 1420 (e.g., the electronic device 102 or 104 of FIG. 1) (operation 1451). The external electronic device 1430 may generate third image data 1415 which is the result of correcting the first image data 1413 received from the electronic device 1410 to correspond to the compatibility information of the first electronic device 1410 via an ISP (e.g., the ISP 333 of FIG. 3) of the external electronic device 1430 and may generate correction information 1417 for the third image data (operation 1453). For example, if the electronic device 320 processes image compression according to the JPEG scheme, and the first electronic device 1420 processes image compression according to the HEIF scheme, the external electronic device 1430 may generate the third image data 1415 which is the result of correcting the first image data 1413 received from the electronic device 1410 and may compress the third image data 1415 according to the HEIF scheme.

The external electronic device 1430 may transmit the package file E which stores the third image data 1415 as representative data and the correction information 1417 for the third image data as additional data to the first electronic device 1420 (operation 1455). Upon receiving the package file E from the external electronic device 1430, the first electronic device 1420 may store the package file E (operation 1457). The first electronic device 1420 may have substantially the same configuration, and perform substantially the same function, as the electronic device 1410 (e.g., the electronic device 320 of FIG. 3).

Figure 15:
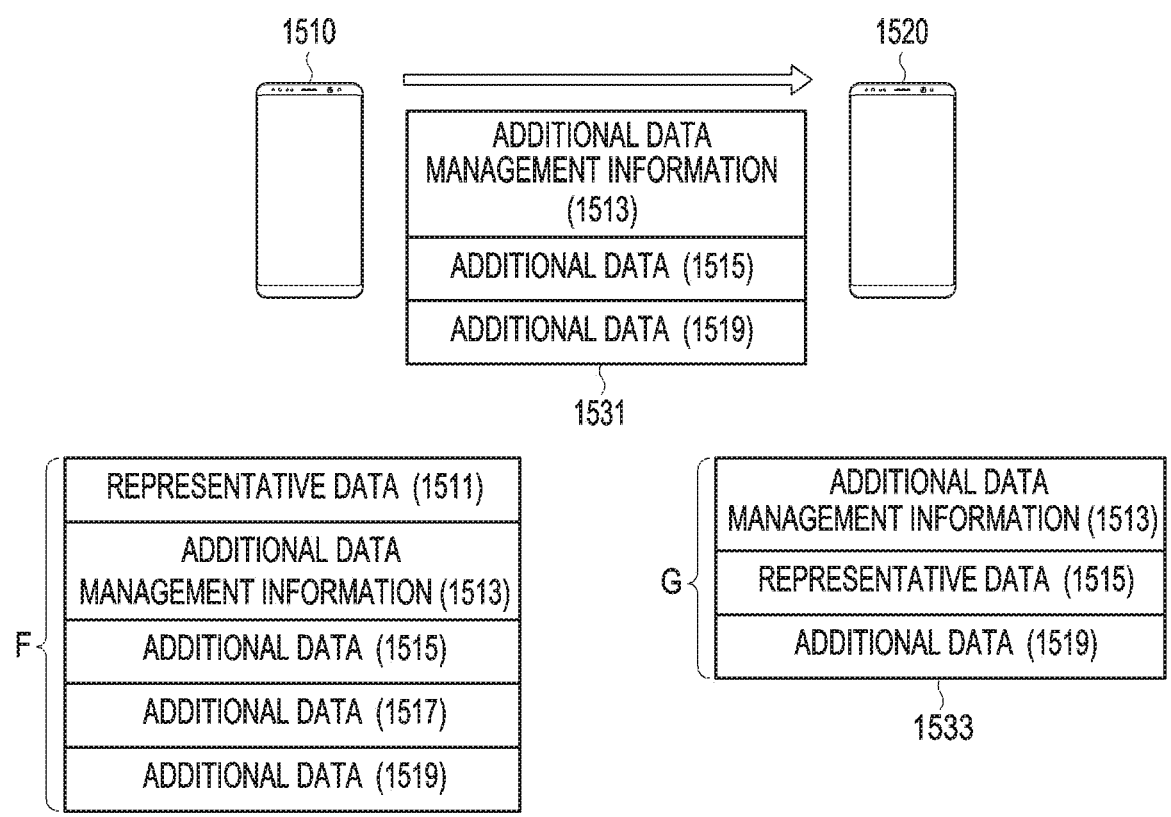
FIG. 15 is a view illustrating the operation of transmitting data by an electronic device according to an embodiment of the disclosure.

FIG. 15 is a view illustrating the operation of transmitting data by an electronic device according to an embodiment of the disclosure.

Referring to FIG. 15, an electronic device 1510 (e.g., the electronic device 320 of FIG. 3) may transmit, to a first electronic device 1520 (e.g., the electronic device 102 or 104 of FIG. 1), a plurality of pieces of additional data 1515 and 1519, which are selected and additional data management information 1513 for checking whether the additional data transforms or for setting the authority for the additional data in a package file F including representative data 1511, additional data management information 1513, and a plurality of pieces of additional data 1515 to 1519 at operation 1531.

Upon receiving the plurality of selected pieces of additional data 1515 and 1519 and the additional data management information 1513 from the electronic device 1510, the first electronic device 1520 (e.g., the electronic device 102 or 104 of FIG. 1) may generate a package file G that stores image data corresponding to the additional data 1515 of the plurality of pieces of additional data 1515 and 1519 as representative data and image data corresponding to the additional data 1519 as additional data and includes the additional data management information 1513 (operation 1533). If the plurality of pieces of additional data 1515 and 1519 are image data, the first electronic device 1520 may store the selected image data as representative data. The first electronic device 1520 may have substantially the same configuration, and perform substantially the same function, as the electronic device 1510 (e.g., the electronic device 320 of FIG. 3).

Figure 16:
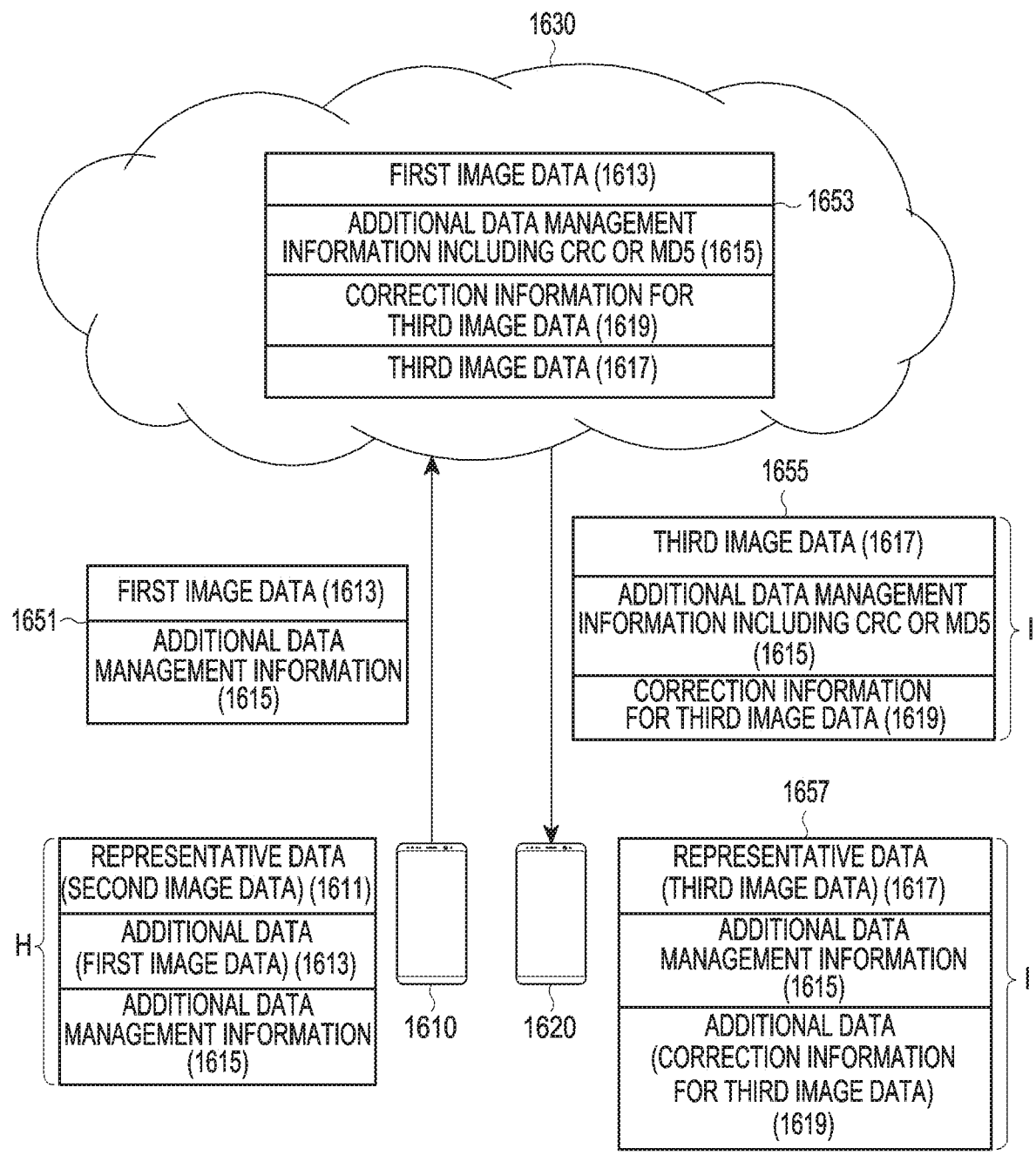
FIG. 16 is a view illustrating the operation of transmitting data by an electronic device according to an embodiment of the disclosure.

FIG. 16 is a view illustrating the operation of transmitting data by an electronic device according to an embodiment of the disclosure.

Referring to FIG. 16, an electronic device 1610 (e.g., the electronic device 320 of FIG. 3) may transmit, to an external electronic device 1630 (e.g., the external electronic device 330 of FIG. 3), first image data 1613 and additional data management information 1615 for checking whether additional data transforms in a package file H that stores second image data 1611, which is the result of correction of the first image data 1613 corresponding to the raw image data by the electronic device 1610, as representative data, and the first image data 1613 corresponding to the raw image data, as additional data, and includes the additional data management information 1615, and the electronic device 1610 may request the external electronic device 1630 to transmit third image data 1617, which is the result of correction of the first image data 1613 by the external electronic device 1630, and the additional data management information 1615 to a first electronic device 1620 (e.g., the electronic device 102 or 104 of FIG. 1) (operation 1651). The external electronic device 1630 may generate third image data 1617 which is the result of correcting the first image data 1613 received from the electronic device 1610 via an ISP (e.g., the ISP 333 of FIG. 3) of the external electronic device 1630 and may generate correction information 1619 for the third image data. The external electronic device 1630 may include the information (e.g., CRC or MD5) for checking whether the additional data transforms in the additional data management information 1615 and store the same (operation 1653).

The external electronic device 1630 may transmit the package file I which stores the third image data 1617 as representative data and the correction information 1619 for the third image data as additional data and includes additional data management information 1615 including the information (e.g., CRC or MD5) for checking whether the additional data transforms to the first electronic device 1620 (operation 1655).

Upon receiving the package file I from the external electronic device 1630, the first electronic device 1620 may store the received package file I (operation 1657). The first electronic device 1620 may have substantially the same configuration, and perform substantially the same function, as the electronic device 1610 (e.g., the electronic device 320 of FIG. 3).

Figure 17:
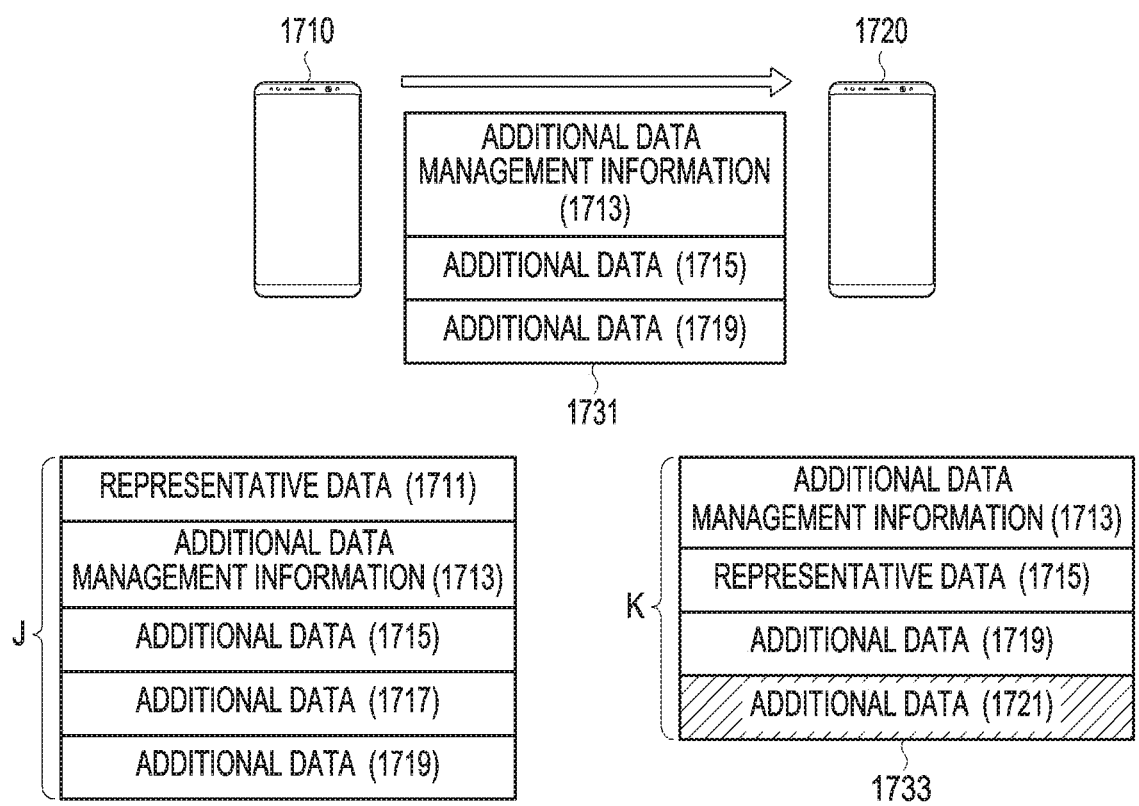
FIG. 17 is a view illustrating the operation of transmitting data by an electronic device according to an embodiment of the disclosure.

FIG. 17 is a view illustrating the operation of transmitting data by an electronic device according to an embodiment of the disclosure.

Referring to FIG. 17, an electronic device 1710 (e.g., the electronic device 320 of FIG. 3) may transmit and additional data management information 1713 and a plurality of pieces of additional data 1715 and 1719, which are selected from a package file J including representative data 1711, the additional data management information 1713, and a plurality of pieces of additional data 1715 to 1719, to a first electronic device 1720 (e.g., the electronic device 102 or 104 of FIG. 1) (operation 1731).

Upon receiving the plurality of pieces of additional data 1715 and 1719 and the additional data management information 1713 from the electronic device 1510, the first electronic device 1720 (e.g., the electronic device 102 or 104 of FIG. 1) may generate a package file K that stores the image data 1715 of the plurality of pieces of additional data 1715 and 1719 as representative data and the remaining additional data 1719 as additional data and includes the additional data management information 1713. If the plurality of pieces of additional data 1715 and 1719 are image data, the first electronic device 1720 may store the selected image data as representative data. If an image or information related to the data of the package file K is generated, the first electronic device 1720 may store the generated image or information as representative data or additional data 1721 of the package file K (operation 1733).

For example, in a case where an image corresponding to the representative data of the package file K or an image corresponding to the additional data is edited by the external electronic device (e.g., the external electronic device 330 of FIG. 3) of the first electronic device 1720 so that new image data is generated, the first electronic device 1720 may generate the new image data as the additional data of the package file K and then store the same as the representative data or additional data 1721 of the package file K and may store edit information for the new image data as the additional data of the package file K.

Figure 18:
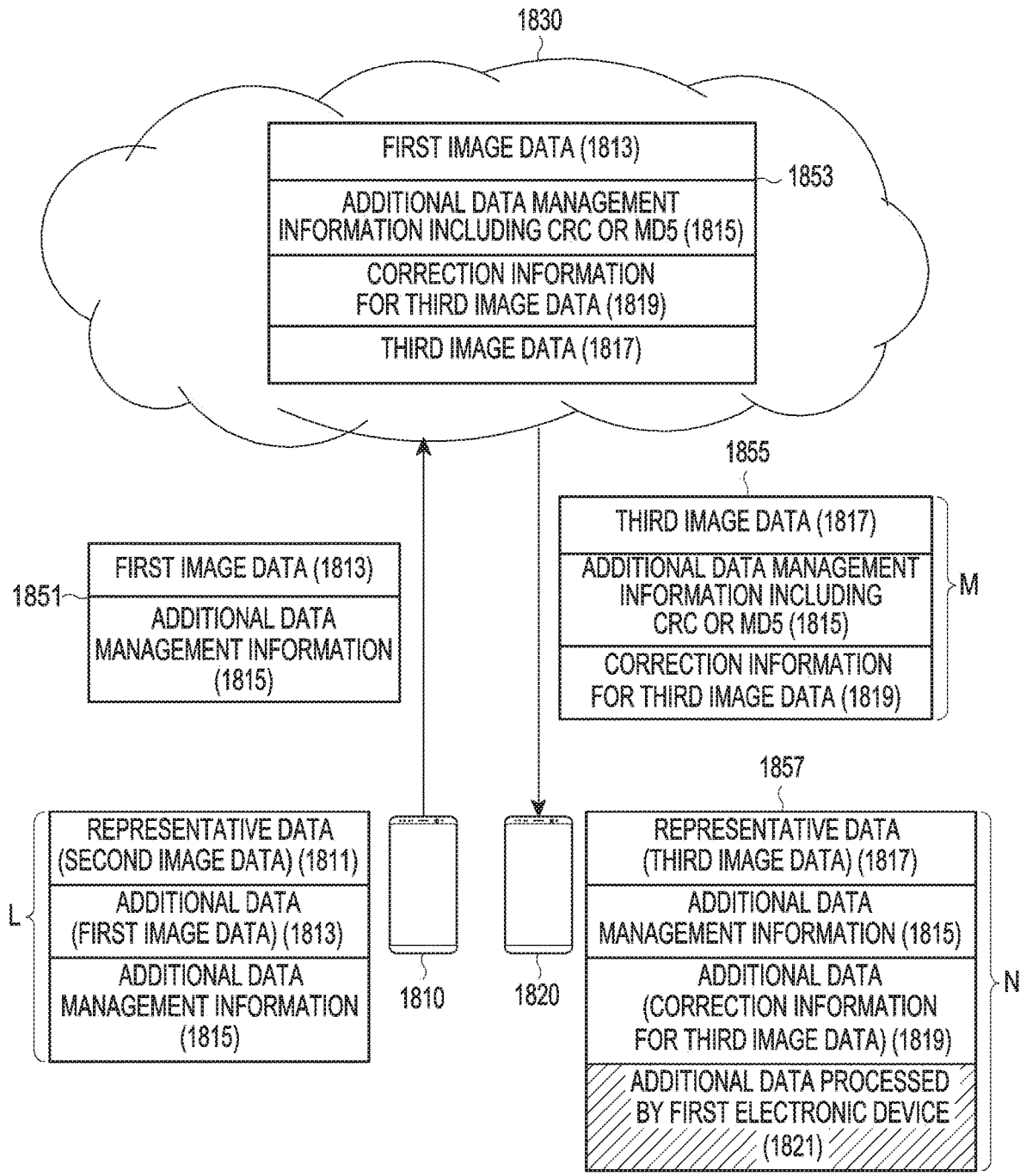
FIG. 18 is a view illustrating the operation of transmitting data by an electronic device according to an embodiment of the disclosure.

FIG. 18 is a view illustrating the operation of transmitting data by an electronic device according to an embodiment of the disclosure.

Referring to FIG. 18, an electronic device 1810 (e.g., the electronic device 320 of FIG. 3) may transmit, to an external electronic device 1830 (e.g., the external electronic device 330 of FIG. 3), first image data 1813 and additional data management information 1815 for checking whether additional data transforms in a package file L that includes second image data 1811, which is the result of correction of the first image data 1813 corresponding to the raw image data by the electronic device 1810, as representative data, and the first image data 1813 corresponding to the raw image data, as additional data, and includes the additional data management information 1815, and the electronic device 1610 may request the external electronic device 1830 to transmit image data 1817, which is the result of correction of the first image data 1813 by the external electronic device 1830, and the additional data management information 1815 to a first electronic device 1820 (e.g., the electronic device 102 or 104 of FIG. 1) (operation 1851).

The external electronic device 1830 may generate third image data 1817 which is the result of correcting the first image data 1813 received from the electronic device 1810 via an ISP (e.g., the ISP 333 of FIG. 3) of the external electronic device 1830 and may generate correction information 1819 for the third image data. The external electronic device 1830 may include the information (e.g., CRC or MD5) for checking whether the additional data transforms in the additional data management information 1815 and store the same (operation 1853).

The external electronic device 1830 may transmit the package file M which stores the third image data 1817 as representative data and the correction information 1819 for the third image data as additional data and includes additional data management information 1815 including the information (e.g., CRC or MD5) for checking whether the additional data transforms to the first electronic device 1820 (operation 1855).

Upon receiving the package file M from the external electronic device 1830, the first electronic device 1820 may store the received package file M. If image data or information related to the package file M is generated, the first electronic device 1820 may generate a package file N that stores the third image data 1817 as representative data, the additional data management information 1815 including the information (e.g., CRC or MD5) for checking whether the additional data transforms, correction information 1819 for the third image data as additional data, and the generated image data or information data as additional data 1821 (operation 1857). For example, in a case where image data corresponding to the representative data of the package file M or image data corresponding to the additional data is edited so that new image data is generated, the first electronic device 1820 may generate a package file L that stores the new image data 1821 as representative data or additional data and may store edit information for the new image data as the additional data of the package file L. The first electronic device 1820 may have substantially the same configuration, and perform substantially the same function, as the electronic device 1810 (e.g., the electronic device 320 of FIG. 3).

According to an embodiment, a method of processing a file by an electronic device (e.g., the electronic device 101 of FIG. 1 or the electronic device 320 of FIG. 3) comprises processing first image data (e.g., the first image data 531 of FIG. 5A) corresponding to raw image data via a first algorithm to generate second image data (e.g., the second image data 510 of FIG. 5A), processing the first image data or the second image data via a second algorithm different from the first algorithm to generate third image data (e.g., the third image data 532 of FIG. 5B), generating a first file (e.g., the package file 500*b* of FIG. 5B) including the second image data and the third image data in a payload, receiving priority information from an external electronic device (e.g., the first electronic device 340 of FIG. 3), generating a second file (e.g., the package file 500*c* of FIG. 5C) including the second image data and the third image data in a payload based on the priority information, and transmitting the second file to the external electronic device.

According to an embodiment, the first algorithm may differ from the second algorithm in at least one of filter, compression scheme, resolution, or image format.

According to an embodiment, the method may further comprise generating management data and adding the management data to the first file, the management data including an identification code for identifying whether there is a transformation for processing at least one of the first image data, the second image data, or the third image data, a read and/or write authority, a distribute authority, whether encoded or not, kind of encoding, or copyright-related data.

According to an embodiment, the method may further comprise generating management data and adding the management data to the second file, the management data including an identification code for identifying whether there is a transformation for processing at least one of the second image data or the third image data, a read and/or write authority, a distribute authority, whether encoded or not, kind of encoding, or copyright-related data.

According to an embodiment, the priority information received from the external electronic device may include information for at least one of a filter, compression scheme, resolution, or image format for the external electronic device to process image data.

According to an embodiment, the method may further comprise receiving fourth image data related to at least one of the first image data, the second image data, or the third image data from the external electronic device and including the fourth image data in the payload of the first file.

According to an embodiment, the method may further comprise editing at least one of the first image data, the second image data, or the third image data to generate fifth image data and including the fifth image data in the payload of the first file.

According to an embodiment, the method may further comprise storing at least one of a plurality of pieces of image data included in the payload of the first file in the external electronic device and storing a location address of the at least one piece of image data stored in the external electronic device in the payload of the first file.

According to an embodiment, the method may further comprise setting one of a plurality of pieces of image data included in the first file as representative data.

According to an embodiment, the method may further comprise transmitting priority information for the electronic device to the external electronic device via the wireless communication circuit, receiving a third file including a plurality of pieces of image data in a payload from the external electronic device based on the priority information for the electronic device, and storing the third file.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "1st" or "first" and "2nd" or "second" may modify corresponding components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., the program 140) containing commands that are stored in a machine (e.g., computer)-readable storage medium (e.g., an internal memory 136) or an external memory 138. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semi-permanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

As is apparent from the foregoing description, according to various embodiments, an electronic device may change the position of some of a plurality of pieces of data included in a file and selectively transmit only some of a plurality of pieces of data included in the file to another electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a housing;
a wireless communication circuit;
a camera exposed through the housing and configured to generate raw image data;
at least one processor operatively connected with the wireless communication circuit and the camera; and
a memory operatively connected with the processor, wherein the memory stores instructions configured, when executed, to enable the processor to:
when first image data corresponding to raw image data is processed via a first algorithm to generate second image data, generate a first file for storing the second image data as representative data and store the first image data as additional data,
when receiving third image data generated by processing the first image data via a second algorithm from a server, change the first file to store the third image data as representative data, and store the first image data and second image data as additional data, respectively,
receive priority information from an external electronic device via the wireless communication circuit,
select at least one image data from the second image data and the third image data included in the first file based on the priority information including information for the external electronic device to process image data,
generate a second file including the at least one image data selected based on the priority information, and
transmit the second file via the wireless communication circuit to the external electronic device.

2. The electronic device of claim 1, wherein at least one of filter, compression scheme, resolution, or image format of the second algorithm is different from the first algorithm.

3. The electronic device of claim 1,
wherein the instructions are further configured to enable the processor to:
generate management data, and
add the management data to the first file, and
wherein the management data includes an identification code for identifying whether there is a transformation for processing at least one of the first image data, the second image data, or the third image data, a read and/or write authority, a distribute authority, an encoded status, a type of encoding, or copyright-related data.

4. The electronic device of claim 1,
wherein the instructions are further configured to enable the processor to:
generate management data, and
add the management data to the second file, and
wherein the management data includes an identification code for identifying whether there is a transformation for processing at least one of the second image data or the third image data, a read and/or write authority, a distribute authority, an encoded status, a type of encoding, or copyright-related data.

5. The electronic device of claim 1, wherein the priority information identifies at least one of a filter, compression scheme, resolution, or image format for the external electronic device to process image data.

6. The electronic device of claim 1, wherein the instructions are further configured to enable the processor to:
receive fourth image data related to at least one of the first image data, the second image data, or the third image data from the external electronic device, and
include the fourth image data in the first file.

7. The electronic device of claim 1, wherein the instructions are further configured to enable the processor to:
edit at least one of the first image data, the second image data, or the third image data and generate fifth image data, and
include the fifth image data in the first file.

8. The electronic device of claim 1, wherein the instructions are further configured to enable the processor to:
store image data included in the first file in the external electronic device, and
store a location address of the image data stored in the external electronic device in the first file.

9. The electronic device of claim 1, wherein the instructions are further configured to enable the processor to set image data included in the first file as representative data.

10. The electronic device of claim 1, wherein the instructions are further configured to enable the processor to:
transmit priority information for the electronic device to the external electronic device via the wireless communication circuit, and
receive a third file including image data from the external electronic device based on the priority information for the electronic device.

11. A method of processing a file by an electronic device, the method comprising:
when first image data corresponding to raw image data is processed via a first algorithm to generate second image data, generating a first file for storing the second image data as representative data and storing the first image data as additional data;
when receiving third image data generated by processing the first image data via a second algorithm from a server, changing the first file to store the third image data as a representative data, and storing the first image data and second image data as additional data, respectively;
receiving priority information from an external electronic device;
selecting at least one image data from the second image data and the third image data included in the first file based on the priority information including information for the external electronic device to process image data;
generating a second file including the at least one image data selected based on the priority information; and
transmitting the second file to the external electronic device.

12. The method of claim 11, wherein at least one of filter, compression scheme, resolution, or image format of the second algorithm is different from the first algorithm.

13. The method of claim 11, further comprising:
generating management data; and
adding the management data to the first file,
wherein the management data includes an identification code for identifying whether there is a transformation for processing at least one of the second image data or the third image data, a read and/or write authority, a distribute authority, an encoded status, a type of encoding, or copyright-related data.

14. The method of claim 11, further comprising:

generating management data; and adding the management data to the second file, wherein the management data includes an identification code for identifying whether there is a transformation for processing at least one of the second image data or the third image data, a read and/or write authority, a distribute authority, an encoded status, a type of encoding, or copyright-related data.

15. The method of claim 11, wherein the priority information identifies at least one of a filter, compression scheme, resolution, or image format for the external electronic device to process image data.

16. The method of claim 11, further comprising:

receiving fourth image data related to at least one of the first image data, the second image data, or the third image data from the external electronic device; and including the fourth image data in the first file.

17. The method of claim 11, further comprising:

editing at least one of the first image data, the second image data, or the third image data and generating fifth image data; and including the fifth image data in the first file.

18. The method of claim 11, further comprising:

storing image data included in the first file in the external electronic device; and storing a location address of the image data stored in the external electronic device in the first file.

19. The method of claim 11, further comprising setting image data included in the first file as representative data.

20. The method of claim 11, further comprising:

transmitting priority information for the electronic device to the external electronic device via a wireless communication circuit; and receiving a third file including a plurality of pieces of image data in a payload from the external electronic device based on the priority information for the electronic device.

\* \* \* \* \*